US 8,696,896 B2

(12) United States Patent
Boyd et al.

(10) Patent No.: US 8,696,896 B2
(45) Date of Patent: Apr. 15, 2014

(54) APPARATUS FOR TREATING LIQUID CONTAINING IMPURITIES

(75) Inventors: Brett H. Boyd, Coral Springs, FL (US); Russell L. Cook, Margate, FL (US); Adrian Streng, Hollywood, FL (US)

(73) Assignee: Parkson Corporation, Fort Lauderdale, FL (US)

( * ) Notice: Subject to any disclaimer, the term of this patent is extended or adjusted under 35 U.S.C. 154(b) by 863 days.

(21) Appl. No.: 12/848,877

(22) Filed: Aug. 2, 2010

(65) Prior Publication Data

US 2011/0168615 A1 Jul. 14, 2011

Related U.S. Application Data

(60) Provisional application No. 61/293,509, filed on Jan. 8, 2010.

(51) Int. Cl.
*B01D 24/40* (2006.01)
*B01D 24/46* (2006.01)

(52) U.S. Cl.
USPC ........... 210/108; 210/189; 210/274; 210/275; 210/277; 210/279

(58) Field of Classification Search
CPC .................................................. B01D 24/4689
USPC ......... 210/105, 106, 108, 189, 274, 275, 277, 210/279, 795
See application file for complete search history.

(56) References Cited

U.S. PATENT DOCUMENTS

| | | | |
|---|---|---|---|
| 4,246,102 | A | 1/1981 | Hjelmner et al. |
| 4,435,286 | A | 3/1984 | Louboutin et al. |
| 5,252,230 | A | 10/1993 | Dunkers |
| 5,468,397 | A | 11/1995 | Barboza et al. |
| 5,582,722 | A | 12/1996 | Wachinski et al. |
| 2003/0220717 | A1 | 11/2003 | Underwood et al. |
| 2005/0077247 | A1 | 4/2005 | Stedman |
| 2006/0081533 | A1 | 4/2006 | Khudenko |
| 2011/0168641 | A1 | 7/2011 | Boyd et al. |
| 2011/0168643 | A1 | 7/2011 | Streng et al. |

OTHER PUBLICATIONS

International Search Report received in corresponding International Application No. PCT/US10/44161 dated Sep. 17, 2010.
International Search Report received in corresponding International Application No. PCT/US10/44103 dated Sep. 27, 2010.

*Primary Examiner* — Terry Cecil
(74) *Attorney, Agent, or Firm* — Gilberto M. Villacorta; Matthew J. Kremer; Foley & Lardner LLP

(57) ABSTRACT

An apparatus for treating a liquid containing impurities may comprise: a filtering chamber for receiving liquid containing impurities, the filtering chamber containing granular media and configured to permit the granular media to interact with the liquid containing impurities, thereby removing impurities from the liquid to produce filtrate; a filtrate section in communication with the filtering chamber for receiving the filtrate, the filtrate section being in communication with a first outlet for outflow of the filtrate; a gas supplying system for delivering gas to the granular media in the filtering chamber for transport of a portion of the granular media to a granular media washer; and a reject section in communication with the granular media washer for receiving a reject mixture comprising liquid and impurities from the granular media washer. The reject section may be in communication with a second outlet for outflow of a portion of the reject mixture.

34 Claims, 14 Drawing Sheets

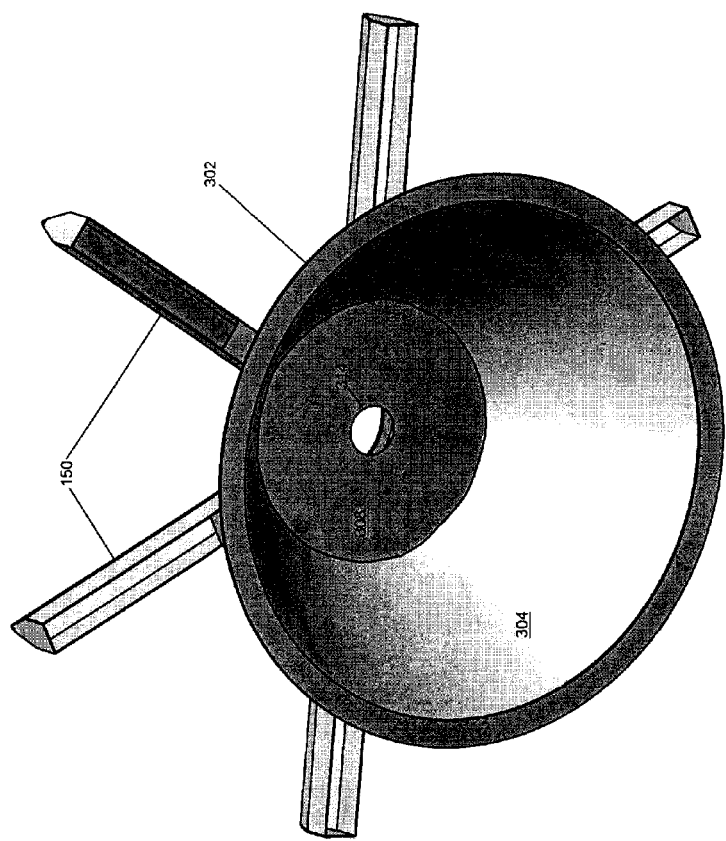
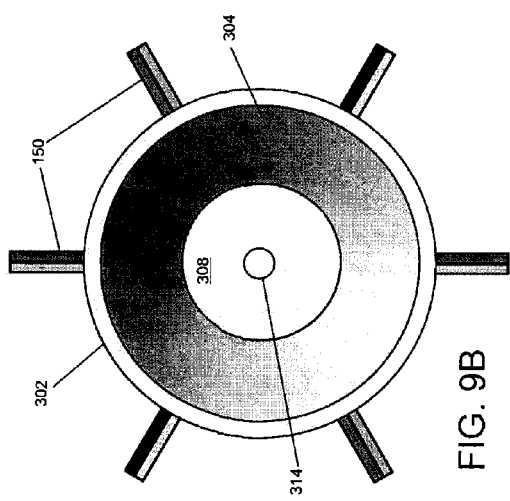
FIG. 9C
FIG. 9B
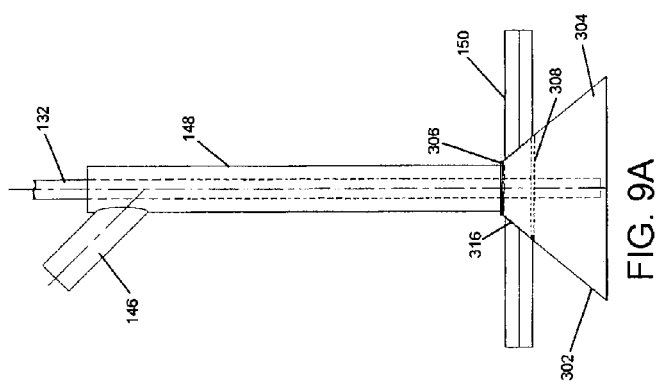
FIG. 9A

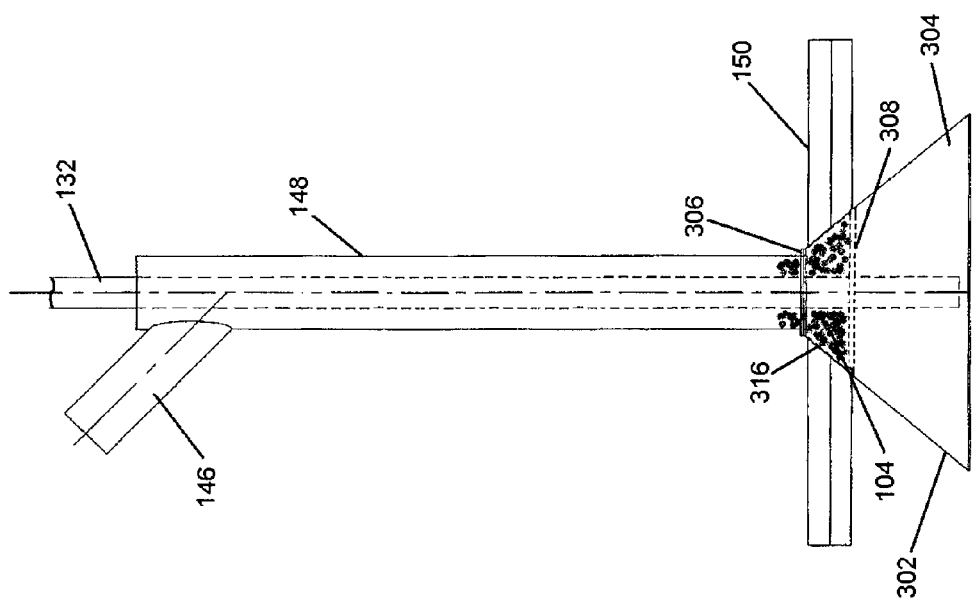
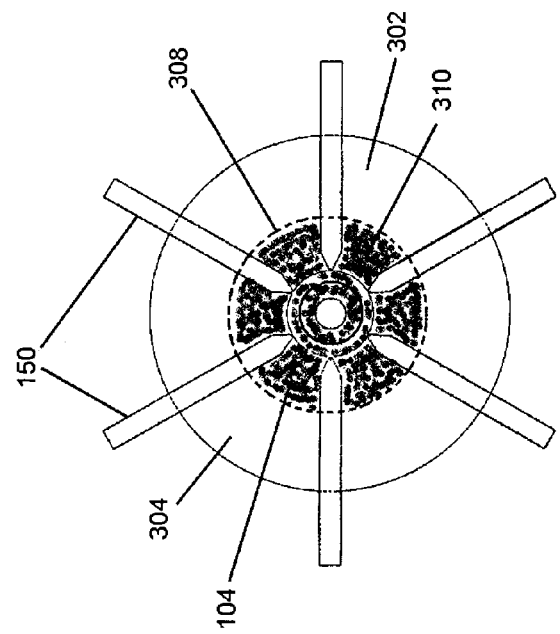
FIG. 11A
FIG. 11B

APPARATUS FOR TREATING LIQUID CONTAINING IMPURITIES

The present invention claims priority to U.S. Provisional Patent Application Ser. No. 61/293,509, entitled METHOD AND APPARATUS FOR TREATING LIQUID CONTAINING IMPURITIES, filed Jan. 8, 2010, which is incorporated in its entirety herein by reference.

BACKGROUND

The present invention relates to an apparatus for treating a liquid containing impurities in which intermittent operation of an airlift function for the transport of granular media to a granular media washer is provided.

In connection with many municipal and industrial water treatment systems, water/wastewater needs to be purified. One example can be a drinking water system in which drinking water is produced from surface water. Another example may be a municipal wastewater treatment system in which wastewater needs to be treated so that it can be discharged or reused for industrial, irrigational, or similar purposes.

Backwash upflow filters typically use airlifts in granular beds to stimulate the interaction between the granular beds and a liquid containing impurities to assist in separating the impurities from the liquid. Such filters typically do not have a device to detect and correct for the loss of airlift function. If the generated airlift stops lifting filter media, after a period of time the filter bed will become packed with impurities. Eventually, "break though" will occur which will release excessive amounts of impurities (such as solid, semi-solid, semi-liquid, or liquid contaminants, etc.) into the filtrate, thus creating unacceptable filtrate quality. The detection of airlift failures conventionally requires physical observation by an operator or administrator, and manual efforts to correct the situation. Unfortunately, airlift failures are often not noticed and corrected for hours or even days, and the corrective actions, such as removal and replacement of the airlift and/or the media bed or labor intensive air lancing of the bed, are required.

It is desired to provide a new and improved method and apparatus for the treatment of a liquid containing impurities, such as wastewater. For example, in the method and apparatus, the impurities and/or pollutants can be separated from the wastewater or other liquid in a granular media filter, such as a sand filter.

SUMMARY

According to one embodiment of the present invention, an apparatus for treating a liquid containing impurities may comprise: a filtering chamber for receiving liquid containing impurities, the filtering chamber including a lower portion containing granular media and configured to permit the granular media to interact with the liquid containing impurities, thereby removing impurities from the liquid to produce filtrate; a filtrate section in fluid communication with the filtering chamber for receiving the filtrate, the filtrate section being in fluid communication with a first outlet for outflow of the filtrate; a gas supplying system for delivering gas to the granular media in the filtering chamber for transport of a portion of the granular media to a granular media washer; a reject section in fluid communication with the granular media washer for receiving a reject mixture comprising liquid and impurities from the granular media washer, the reject section being in fluid communication with a second outlet for outflow of a portion of the reject mixture; a valve disposed at the second outlet; and a control unit. The control unit may be configured to: (i) determine whether the portion of the granular media is being transported properly; (ii) control the gas supplying system; and (iii) control the valve.

According to another embodiment of the present invention, an apparatus for treating a liquid containing impurities may comprise: a filtering chamber for receiving liquid containing impurities from a liquid feed line, the filtering chamber including a lower portion containing granular media and configured to permit the granular media to interact with the liquid containing impurities, thereby removing impurities from the liquid to produce filtrate; a plurality of feed arms in fluid communication with the liquid feed line, which extend radially in the lower portion of the filtering chamber, for feeding liquid to the granular media through one or more openings along each feed arm, a top of each feed arm presenting one or more cutting edges; a filtrate section in fluid communication with the filtering chamber for receiving the filtrate, the filtrate section being in fluid communication with a first outlet for outflow of the filtrate; a gas supplying system for delivering gas to the granular media in the filtering chamber for transport of a portion of the granular media to a granular media washer; a reject section in fluid communication with the granular media washer for receiving a reject mixture comprising liquid and impurities from the granular media washer, the reject section being in fluid communication with a second outlet for outflow of a portion of the reject mixture; a valve disposed at the second outlet; and a control unit. The control unit may be configured to: (i) receive one or more signals from at least one sensor; (ii) control the gas supplying system; and (iii) control the valve.

According to another embodiment of the present invention, an apparatus for treating a liquid containing impurities may comprise: a filtering chamber for receiving liquid containing impurities from a liquid feed line, the filtering chamber including a lower portion containing granular media and configured to permit the granular media to interact with the liquid containing impurities, thereby removing impurities from the liquid to produce filtrate; a plurality of feed arms in fluid communication with the liquid feed line, which extend radially in the lower portion of the filtering chamber, for feeding liquid to the granular media through one or more openings along each feed arm, a top of each feed arm presenting one or more cutting edges; an annular space in fluid communication with the liquid feed line and the plurality of feed arms, the annular space equipped with a bottom plate having a plurality of openings; a filtrate section in fluid communication with the filtering chamber for receiving the filtrate, the filtrate section being in fluid communication with a first outlet for outflow of the filtrate; a gas supplying system for delivering gas to the granular media in the filtering chamber for transport of a portion of the granular media to a granular media washer; and a reject section in fluid communication with the granular media washer for receiving a reject mixture comprising liquid and impurities from the granular media washer. The reject section may be in fluid communication with a second outlet for outflow of a portion of the reject mixture.

It is to be understood that both the foregoing general description and the following detailed descriptions are exemplary and explanatory only, and are not restrictive of the invention as claimed.

BRIEF DESCRIPTION OF THE DRAWINGS

The features, aspects, and advantages of the present invention will become apparent from the description, appended claims, and the accompanying exemplary embodiments shown in the drawings, which are briefly described below.

FIGS. 9A, 9B, 9C and 9D show a configuration of the plurality of radial feed arms and the channeling member according to one embodiment of the present invention.

FIGS. 11A and 11B show a configuration of the plurality of radial feed arms and the channeling member in which the annular space is packed with granular media.

DETAILED DESCRIPTION

Various embodiments of the present invention will be explained with reference to the accompanying drawings.

Figure 1:
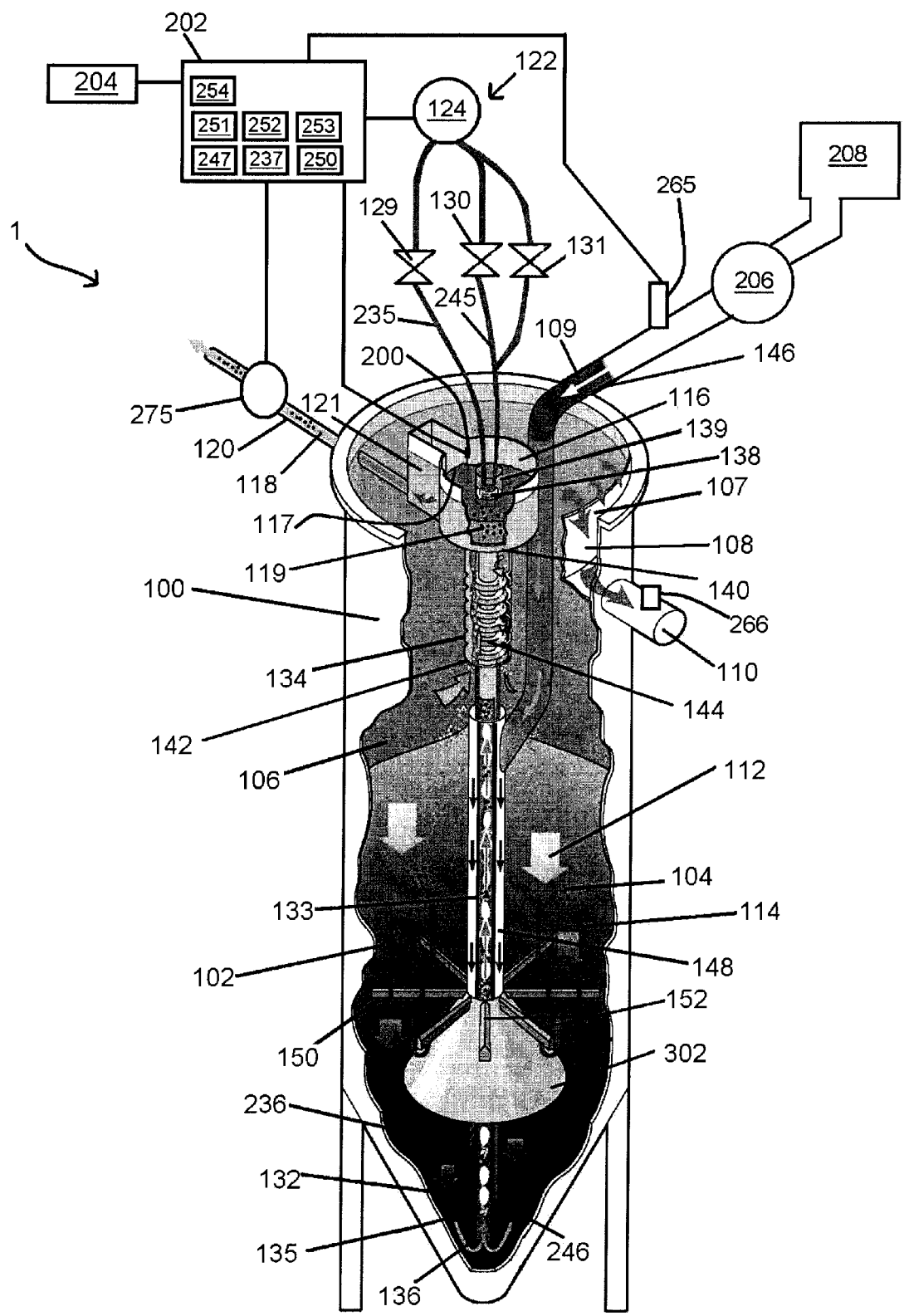
FIG. 1 shows a schematic drawing of an apparatus for treating a liquid containing impurities according to an embodiment of the present invention.

FIG. 1 shows an apparatus 1 for treating a liquid containing impurities (for example, any undesired material) according to an embodiment of the present invention. The apparatus 1 may be an upflow, deep bed granular media filter with semi-continuous or periodic backwash. Periodically or semi-continuous operation may be only a fraction of the time relative to continuous operation, for example, 5%, 10%, 20%, 30%, 40% or any increment therebetween of the time relative to continuous operation. The liquid containing impurities (for example, wastewater) is introduced through an inlet 109 and channeled to below a portion of the granular media 104 (which can be, for example, sand) and into the filtering chamber 100. A bed of granular media 104 (which acts as the filtering medium) fills the lower portion of the filtering chamber.

The liquid containing impurities will rise upward in the filtering chamber 100 so that it flows through the granular media bed. The filtration of the liquid takes place as the granular media is traveling slowly downward in the filtering chamber 100 as indicated by arrow 112 such that removal of the impurities from the liquid is facilitated by the granular media to produce the filtrate. Gas may be also supplied intermittently to an airlift pump 132 near the bottom of the filtering chamber at the injection point 135. The airlift pump 132 is channeled in an airlift housing 133 in which fins attached to the outer surface of the airlift pump 132 centralizes the airlift pump 132 in the airlift housing 133. The gas is introduced intermittently into the airlift pump 132, which will then contain a mixture of liquid, air and granular filter medium. The mixture of liquid, air and granular filter medium has a lower density than the surrounding liquid causing the mixture to rise in the airlift pump 132 during the airlift operation. As this mixture rises in the airlift pump, granular media and liquid near the bottom of the filtering chamber will flow into the airlift pump 132 such that the dirtiest of the granular media tends to flow into and upward in the airlift pump 132.

As the dirty granular media flows upward in the airlift pump during the intermittent airlift operation, the granular media is subjected to a thorough mechanical agitation by the action of the gas bubbles within the airlift pump 132 and the impurities (such as, dirt or other undesirable material) is separated from the granular media. In order to further clean the particles or granular media, the media is washed in a granular media washer 134 which is located near the top end of the filtering chamber 100. The cleaned granular media from the granular media washer 134 is returned to the top of the bed of granular media 104 whereas the reject from the granular media washer 134 flows from the washer 104 to a reject section 116 so as to be discharged through the outlet 120. On the other hand, the treated liquid or filtrate flows into a filtrate section 108 and is discharged as an effluent through an outlet 110.

Using an upflow, deep bed granular media filter (such as the one in FIG. 1), the filter media may be cleaned by a simple internal washing system that does not require backwash pumps or storage tanks. The absence of backwash pumps has the advantage of low energy consumption. The granular media bed allows the apparatus to handle high levels of impurities (such as solid, semi-solid, semi-liquid, or liquid contaminants, etc.) and this heavy-duty performance may eliminate the need for pre-sedimentation or flotation steps in the treatment process in some applications. The granular media permits a substantial removal of the impurities from the liquid, such as up to 85, 90, 95, 99% or more, or any integer therebetween.

To make the system as efficient as possible, such as to have the total amount of reject produced be about 1-2% or less of the feed flow, intermittent operation of the airlift of the dirty granular media flows upward in the airlift pump 132 may be used. This higher filtrate quality is achieved because a granular media bed that is not constantly subject to the airlift operation has more impurities embedded into it as a result of build-up. To a certain degree, this "dirtier" media bed produces a tighter (or higher density) filter to better trap or catch incoming impurities (such as solid, semi-solid, semi-liquid, or liquid contaminants, etc.), thus producing a better filtrate. This phenomenon is known as the Schmutzdecke (German for "layer of dirt") Effect. Thus, intermittent operation of the airlift function may produce higher filtrate quality because the granular media bed is a higher quality filter when not being constantly cleaned.

Additionally, intermittent operation of the airlift function may provide other benefits beside improving the efficiency of the filtering process. Some benefits may include: reduced compressed air flow (estimated to be 50-90% savings); reduced wear and tear on the gas delivery system (estimated to be 50-90% savings); reduced wear and tear on the airlift pump (estimated to increase life by two to nine times); reduced electrical/energy consumption (estimated to be 50-90% savings); and reduced chemical consumption and cost (in some cases, perhaps up to 100%). The reduction in chemical consumption and cost is interrelated to the increase in filtering efficiency. For example, the filtrate quality that was achieved previously only with chemical addition could now be achieved without any chemical addition by using the intermittent airlift operation.

To perform intermittent operation of the airlift function, at least one of the two following mechanisms may be used: (1) detecting the head loss in the system for determining when to operate the gas supplying system 122 to cause the airlift operation; and/or (2) using an intermittent timer for intermittently operating the gas supplying system 122 to cause the airlift operation. In regard to using the automatic valve, when the head loss gets to a high set level, an automatic valve 275 is opened, and the air control from the control unit 202 starts the airlift operation. When the head loss drops below a given low set point, the air supply to the airlift stops, and the automatic valve 275 closes. In regard to the intermittent timer, the airlift function may be controlled by the control unit 204 at predetermined time intervals. Both of these mechanisms will be discussed later in more detail.

The details of the apparatus 1 in FIG. 1 will now be described. The apparatus 1 may comprise a filtering chamber 100 for accepting the liquid containing impurities, a filtrate section 108, a reject section 116, a gas supplying system 122, and a control unit 202.

The filtering chamber 100 includes a lower portion 102 in which granular media 104 removes the impurities from the liquid within the first inlet 109 to produce filtrate 106. The lower portion 102 is deemed lower because it is positioned within the lower half of the filtering chamber in a vertical direction. Although the filtering chamber 100 of FIG. 1 has a cylindrical shape, any suitable shape may be used, such as a chamber having a cross-section that is circular, rectangular, square, triangular, or other polygonal or non-polygonal shapes. The filtering chamber 100 may be in fluid communication with a first inlet 109 for the inflow of influent or liquid containing impurities. Also, the lower portion 102 of FIG. 1 has a conical shape but any suitable shape may be used. Still further, an optional drain (not shown) may be provided at or near the bottom of the filtering chamber 100.

The first inlet 109 may be in fluid communication with a liquid source 208 (such as a reservoir) which contains the liquid containing impurities. The liquid 106 may be wastewater or water with impurities. A pumping system 206 can be used to channel the liquid from the liquid source 208 to the first inlet 109. The pumping system 206 may contain all the necessary equipment to initiate and maintain the fluid flow between the liquid source 208 and the filtering chamber 100, such as a pump, a control valve, and/or suitable piping/tubing. The first inlet 109 may be a liquid feed line, which may include a feed pipe 146 and an annular pipe 148, and the liquid feed line is in fluid communication with a plurality of radial pipes or radial feed arms 150. The influent or liquid containing impurities is introduced at the top of the feed pipe 146 and flows downward through the annular pipe 148 around the airlift pump 132 (to be described later). The annular pipe 148 is sealed at its top end and is in fluid communication with the feed pipe 146 and the radial feed arms 150 such that the liquid is introduced into the bed of the granular media 104 through the series of radial feed arms 150 that are open or have one or more individual openings along their longitudinal length on the sides facing the bottom of the filtering chamber 100 (that is, downward in FIG. 1).

Other configurations for the inlet are contemplated. For example, alternative embodiments of the present invention may include one or more of the following structures: (1) the feed pipe 146 may be directly connected to the radial feed arms 150 without the annular pipe 148; (2) the radial feed arms 150 have a different configuration, such as the radial feed arms 150 (a) may be opened at their distal ends, (b) may have outlets along their circumferential surfaces in the form of one or more holes along their bottom surfaces, (c) may simply be U-shaped structures with their open ends facing downward, and (d) the radial feed arms may have one or more openings along each feed arm in which each feed arm is in the form of a hexagon, a triangle, semi-circle or the like, all of which may have the openings on their respective bottom surfaces facing downward; (3) a pipe running parallel to the airlift pump 132 may be used instead of the annular pipe 148, and/or (4) the feed pipe 146 may enter the filtering chamber near the bottom or towards the center of the filtering chamber instead of at the top.

FIGS. 9A-9D shows one configuration of the airlift pump 132, the feed pipe 146, the annular pipe 148, the plurality of radial feed arms 150, and a channeling member 302. The channeling member 302 may comprise a conical plate 304, a top plate 306, and a bottom plate 308. The top plate and bottom plates are spaced at a predetermined distance from each other such that an annular space 310 bordered by the top plate 306, the bottom plate 308, and a portion of the conical plate 304 is formed and in fluid communication with the liquid feed line and the plurality of feed arms 150. The top plate 306 may have an aperture 312 through which the annular pipe 148 may be fed, and may be a separate plate or may be formed integrally with the conical plate 304, for example by bending the top edge of the conical plate inward. The bottom plate 308 may have an aperture 314 that is aligned with the aperture 312 of the top plate 306 through which the airlift pump 132 (which is coaxial with the annular pipe 148) is fed. The conical plate 304 may have apertures 316 through which the radial feed arms 150 are fed through and attached such that the radial feed arms 150 are in fluid communication with the annular space 310. The annular pipe 148 can terminate inside the annular space 310 such that the liquid containing impurities is fed into the annular space 310 via the annular pipe 148 and then flows out in the filtering chamber 100 via the radial feed arms 150.

Figure 10B:
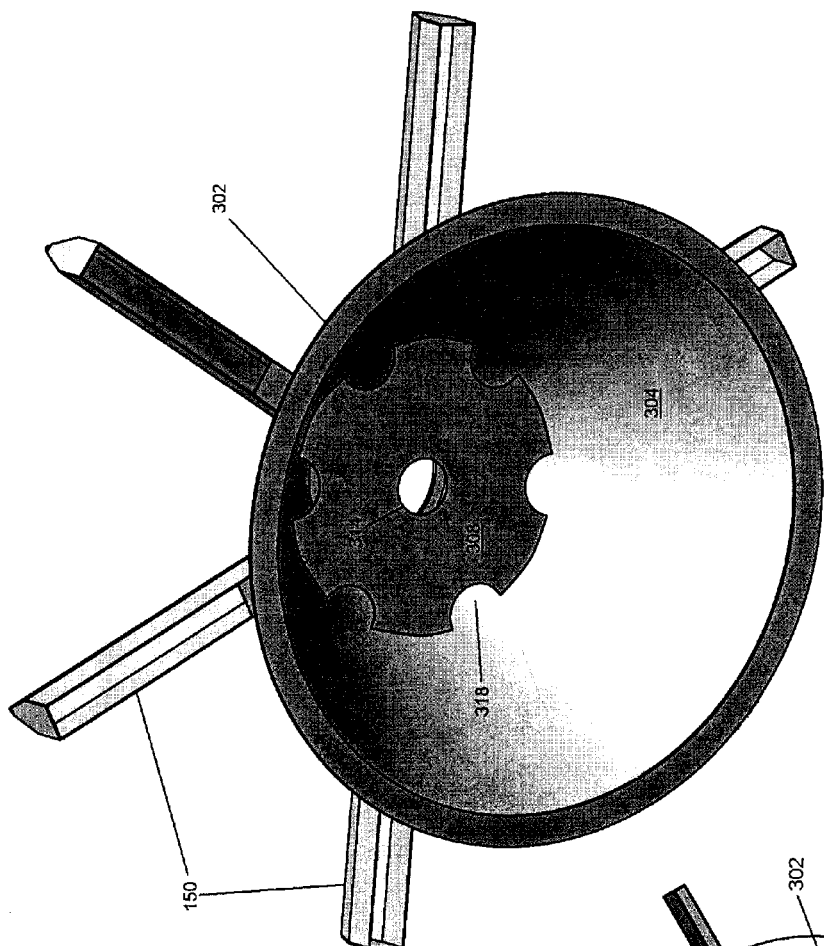
FIGS. 10A, 10B and 10C show a configuration of the plurality of radial feed arms and the channeling member according to another embodiment of the present invention.
Figure 10A:
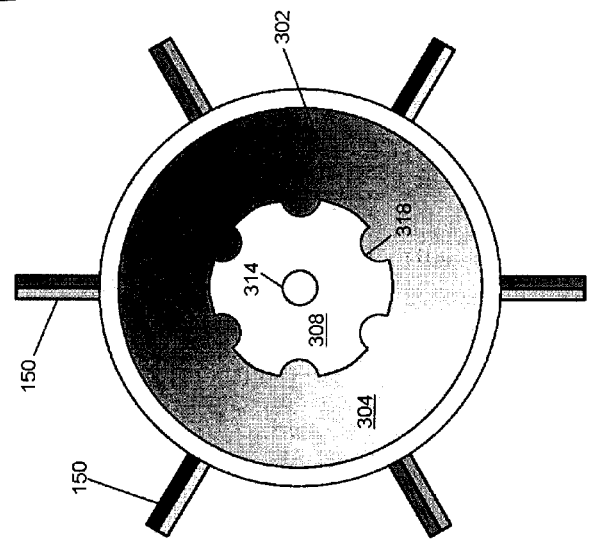
Figure 10C:
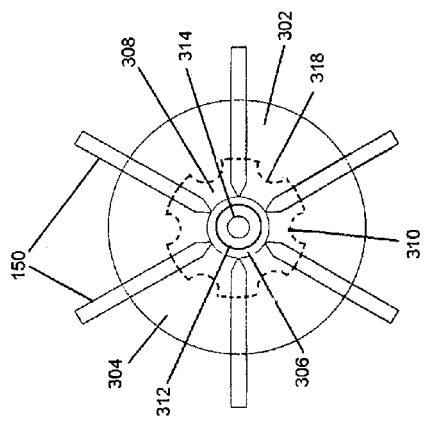

An alternative configuration to the channeling member 302 is shown in FIGS. 10A-10C in which the configuration is substantially the same as shown in FIGS. 9A-9D but the annular space 310 is equipped with a bottom plate 308 having a plurality of openings 318 that empties into the lower portion 102 of the filtering chamber 100. The plurality of openings 318 in the bottom plate 308 provides the following benefit.

There may be occasions in which the annular space 310 may be packed with granular media 104 which ends up filling the bottom of the annular space 310 and the annular pipe 148, as seen in FIGS. 11A and 11B. Some causes of this packing may be that the granular media 104 has been airlifted into the annular space 310 by the gas supplying system 122 (to be described later) and the bottom of the feed annular space 310 has the flat, sealed donut-shaped bottom plate 308; a feed backflow phenomenon occurs in which, if there is reverse flow, the liquid could entrain granular media into the feed annular space 310; and/or impurities (such as solid, semi-solid, semi-liquid, or liquid contaminants, etc.) enter into the annular space with the incoming liquid and will build up in the annular space 308 to the point of eventually blocking the feed flow. The granular media may become packed in the annular space and annular pipe to the point that the flow of the incoming liquid may be blocked. The plurality of openings 318 in the bottom plate 308 would slow down, inhibit, or even prevent the granular media from accumulating because the granular media and accumulated impurities would be able to freely fall through the openings 318 and underneath the channeling member 302. Thus, there would be no blockage of the flow of incoming liquid.

The number of openings 318 are shown to be six in FIGS. 10A-10B, but any suitable number may be used, such as one, two, three, four, five, seven or more. Each of the plurality of openings 318 may be positioned between adjacent feed arms 150 or a plurality of openings may be positioned between adjacent feed arms 150. The openings 318 may be any suitable size or shape. For example, the openings may be semi-circular cutouts, eye-shaped cutouts, circular, or any other suitable shape.

Referring back to FIG. 1, the granular media 104 may be sand and may create any suitable size of bed, such as a 40" high bed or a 80" high bed. Further, the bed may be any suitable area. Suitable areas may include, for example, 1, 2, 3, 4, 5, or more square meters, and may also include less than 1 square meter.

The granular media 104 in the filtering chamber can descend in a downward direction as indicated by the arrow 112 and the liquid 106 in the filtering chamber 100 can flow in an upward direction such that the impurities are removed from the liquid by impacting the granular media 104 to produce filtrate at the top of the bed of granular media 104. Indeed, the filtration of the liquid takes place as the granular media 104 is traveling slowly downward in the filtering chamber 100 as indicated by arrow 112. The slow downward movement of the granular media in the bed is caused by the granular media being sent up into the airlift pump 132 by the intermittent airlift operation of the gas supplying system 122.

The filtrate section 108 may be in fluid communication with the lower portion 102 of the filtering chamber 100 for receiving the filtrate that has passed through the granular media 104. The filtrate section may be an open end container, enclosure, or any suitable fluid containing structure. According to one possible implementation, the filtrate section 108 comprises a weir 107. The filtrate that has emerged at the top portion of the filtering chamber 100 pours over the weir 107 and into the filtrate section 108. The filtrate section 108 may be in fluid communication with a first outlet 110 for the outflow of effluent or the filtrate. The first outlet 110 may be piping, tubing, or connections in which piping or tubing may be connected.

The reject section 116 may be in fluid communication with the lower portion 102 of the filtering chamber 100 for receiving a reject mixture 118 containing granular media and impurities at a top end 138 of the airlift pump 132. The reject section 116 may be an open end container, enclosure, or any suitable fluid containing structure. The fluid communication can be configured such that the reject section 116 is in fluid communication with the airlift pump 132. The airlift pump 132 is a structure, such as a cylindrical pipe or tube, that may run through the center of the filtering chamber 100 and inside the airlift housing 133. The airlift pump 132 terminates at the top end 138 disposed in the reject section 116. An optional splashguard 139 may be included (shown in FIGS. 1 and 8 but not shown in FIGS. 2 and 3), which may be a cylindrical or other shaped tube attached to the airlift pump 132.

The airlift pump 132 may also pass through a central portion of the conical space of the lower portion 102 of the filtering chamber 100. As the granular media 104 in the filtering chamber 100 descends in the downward direction 112 such that the impurities are removed from the liquid by the granular media 104, near the bottom of the filtering chamber 100, a small volume of compressed gas, such as air, nitrogen, oxygen, or the like, may be intermittently introduced at the bottom of the filtering chamber 100 by the gas supplying system 122 so as to draw the granular media into the airlift pump 132 at the bottom end 136 of the airlift pump 132. Scouring inside the airlift pump 132 dislodges any impurities (such as solid, semi-solid, semi-liquid, or liquid contaminants, etc.) attached to the granular media. The reject mixture of granular media and dislodged impurities (which may form a dirty slurry) is pushed to the top end 138 of the airlift pump 132 and into the reject section 116.

The reject section 116 may comprise an inlet section 119 and an outlet section 121 that are isolated from each other by a weir 117. The reject mixture that has emerged from the airlift pump 132 at the top end 138 of the airlift pump 132 fills up the inlet section 119 of the reject section 116 until a portion of the reject mixture pours over the weir 117 into the outlet section 121 of the reject section. The outlet section 121 of the reject section 116 may also be in fluid communication with a second outlet 120 for the outflow of the portion of the reject mixture 118 that has poured over the weir 117. The second outlet 120 may be a piping, tubing, or a connection in which piping or tubing may be connected. An automatic valve 275 may be placed on or near the second outlet 120. The automatic valve may be controlled to be opened or closed based on commands from the control unit 202 and the control unit is configured to open the valve 275 to allow outflow of a portion of the reject mixture or to close the valve 275 to preclude outflow of a portion of the reject mixture. The automatic valve 275 may be any type of controllable valve known in the art.

Figure 2:
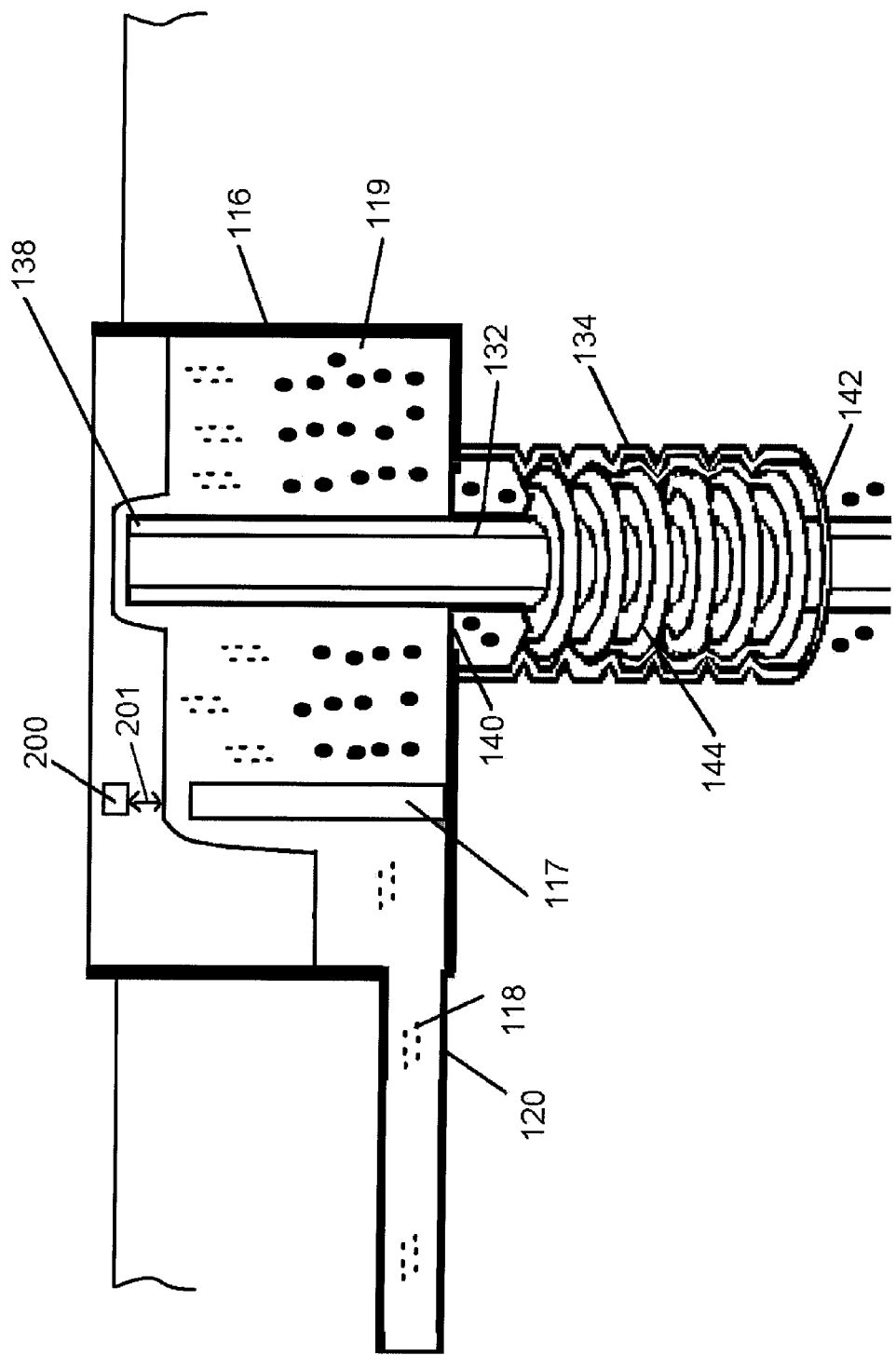
FIG. 2 shows a schematic drawing of the reject section of FIG. 1.

As seen in FIG. 1 and FIG. 2, the inlet section 119 of the reject section 116 also is in fluid communication with a granular media washer 134. The granular media washer has a granular media inlet 140, a granular media outlet 142, and concentric stages 144. From the reject section 116, the heavier granular media 104 falls into the granular media washer 134 via the granular media inlet 140 and the lighter reject impurities that were dislodged from the granular media flow are eventually poured over the weir 117 and out the second outlet 120 if the automatic valve 275 is opened. The granular media 104 cascades down through the concentric stages 144 of the granular media washer 134. The concentric stages 144 may simply comprise spiral flights around the airlift pump 132. As the granular media is cascading down the concentric stages, it encounters a small amount of filtrate moving upward through the washer 134 from the granular media outlet 142 (for example, about 1-2% of the feed rate). This filtrate in the washer 134 is driven by the difference in liquid level between the weir 107 of the filtrate section 108 and the weir 117 of the rejection section 116. The heavier, coarser granular media flows through this small counter current flow while the remaining impurities are carried back up to the reject section 116. The washed granular media returns to the filtering chamber 100 and is deposited on the top of the granular media bed where it once again begins the influent cleaning process and its eventual migration to the bottom of the filtering chamber 100.

The gas supplying system 122 may be provided for intermittently delivering gas to the granular media 104 in the filtering chamber 100 to provide airlift such that a portion of the granular media in the filtering chamber may be transported to the granular media washer 134 (via the airlift pump 132 and the rejected section 116). The gas supplying system 122 may comprise a gas source 124, an upper gas supply line 235 with a first gas valve 129, and a lower gas supply line 245 with a second gas valve 130 and a third gas valve 131. The upper and lower air supply lines 235 and 245 form at least two separate paths for supplying gas, and are in fluid communication with the gas source 124 via their respective first, second, and third gas valves, and in fluid communication with the lower portion 102 of the filtering chamber 100. The gas source 124 may be a fan, a gas pump, a pressurized cylinder of gas, or some other suitable source of gas. The gas being introduced into the filtering chamber 100 by the gas source 124 may be air, nitrogen, oxygen, or some other suitable gas. The gas valves 129, 130, and 131 may be used to control the gas flow and/or pressure from the gas source 124 to the lower portion 102 of the filtering chamber 100 or the gas valves 129, 130, and 131 may be omitted if the gas flow and/or pressure is adjustable at the gas source 124 itself. In one embodiment, the gas valves 129, 130, and 131 may be solenoid valves. The gas valve 129 may be configured to provide bursts of gas through the upper gas supply line 235 while the gas valve 130 may be configured to provide bursts of gas through the lower gas supply line 245 and the gas valve 131 may be configured to provide continuous gas flow through the lower gas supply line 245 for normal airlift operation. Thus, the gas supplying system 122 permits an airflow comprising bursts of gas, a steady flow of gas, or a combination thereof in which the control unit 202 is configured to independently initiate, maintain, or terminate gas flowing through each of the upper and lower gas supply lines 235 and 245, as separate paths of the gas supplying system 122 by controlling valves 129, 130, and 131.

In FIG. 1, the upper and lower gas supply lines 235 and 245 are fed into the filtering chamber 100 in the circumferential wall of the airlift pump 132 such that the outlet 236 of the upper gas supply line 235 is placed in a position that is vertically higher than the outlet 246 of the lower gas supply line 245. The upper and lower gas supply lines 235 and 245 may be fed into the filtering chamber 100 in other forms as well. For example, the gas supply lines 235 and 245 may be fed through the bottom side walls of the filtering chamber; through the floor of the filtering chamber; from the top of the filtering chamber between the airlift pump 132 and the annular pipe 148 and through the channeling member 302; or from the top of the filtering chamber but outside of the airlift pump 132, the annular pipe 148, and through the channeling member 302. In whatever manner, the gas supply lines may form at least two separate paths of the gas supplying system 122 that terminate at the lower portion 102 of the filtering chamber 100 in which one of the separate paths terminates at an upper position in the lower portion 102 of the filtering chamber 100 and the other of the two separate paths terminates at a lower position in the lower portion 102 of the filtering chamber 100, the upper position being above the lower position.

As used herein, the term "airlift" is meant to encompass lift caused by gas delivery by the gas supplying system regardless of the type of gas used. In other words, "airlift" encompasses lift by any suitable gas, such as nitrogen, oxygen, or other suitable gases beside air.

A sensor 200 may be provided for determining a level of reject mixture in the reject section 116 and the control unit 202 may control the initiation, maintenance, or termination of the gas flow from the gas supplying system 122 and receive one or more signals from the sensor 200. Alternatively, a flow meter may be provided for determining the amount of reject flow in the reject section 116 and the control unit 202 may receive one or more signals from the flow meter. Typically, when an airlift stops lifting the filter media, the reject flow rate increases. A lack of airlift prevents the granular media from being drawn into the airlift pump 132 at the bottom end 136 of the airlift pump 132 and entering the reject section 116. The airlifted media grains falling down through the concentric stages 144 of the granular media washer 134 usually restrict the upward flow of the wash liquid (the wash liquid being clean filtrate below the granular media washer 134 that becomes reject liquid as it moves upward through the concentric stages 144 of the granular media washer 134 scouring the dirt and impurities from the falling filter media). If there is less or no granular media in the reject section 116 that can fall through the granular media washer 134, there is no falling media to restrict the upward rise of the wash liquid through the granular media washer 134; thus causing more than normal fluid flow into the reject section. As a result, the reject flow rate increases when the airlift stops functioning. Thus, the amount of reject mixture is increased in the reject section, and particularly in the inlet section and the area above the weir 117 of the reject section. Although the following description places the sensor above the weir 117 in the reject section 116, the sensor 200 can alternatively be placed on either side of the weir in the inlet section 119 or in the outlet section 121.

Figure 3:
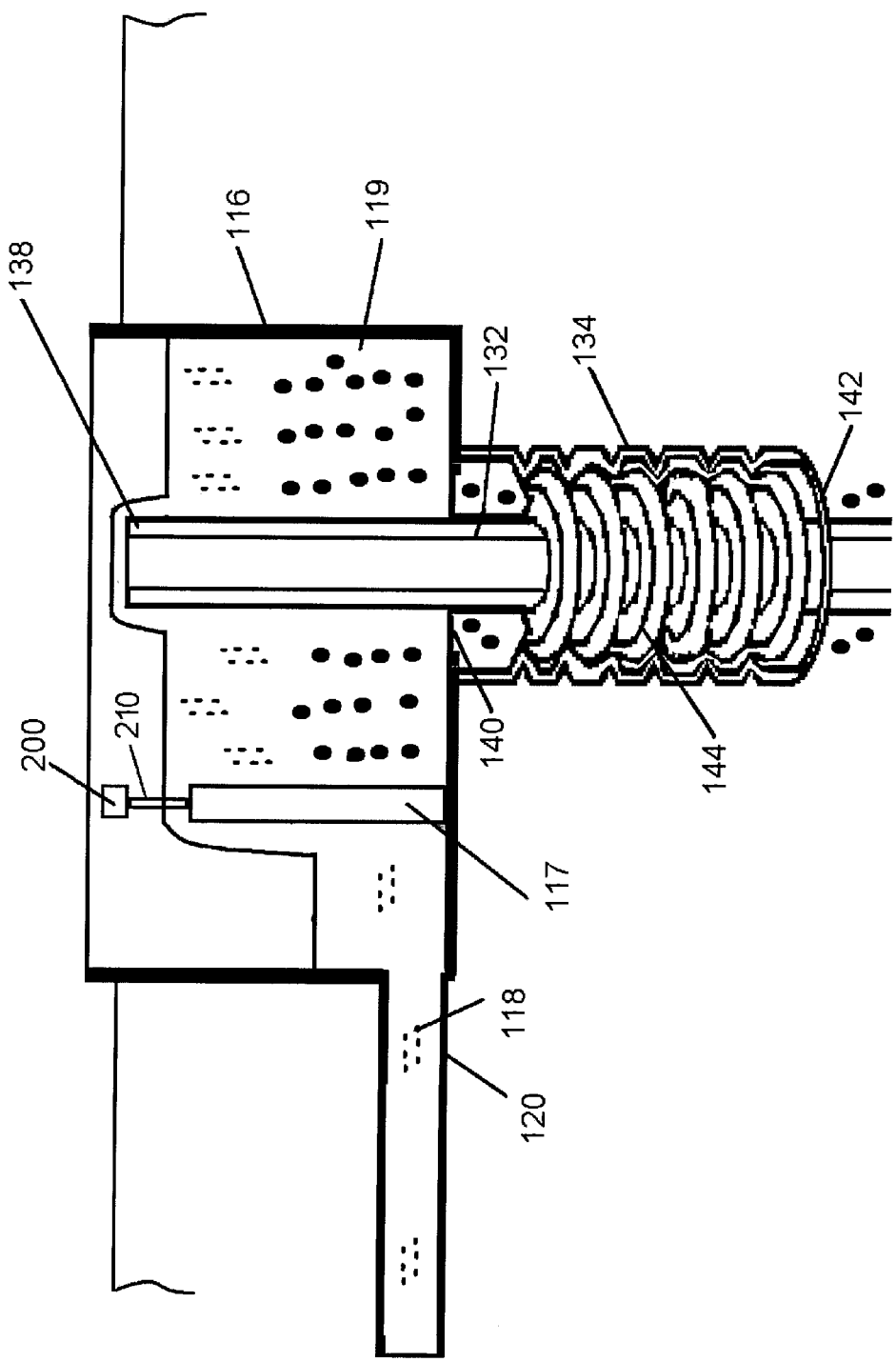
FIG. 3 shows a schematic drawing of an alternate embodiment of the reject section of FIG. 1.

The combination of the sensor and control unit can be configured to effectively and continuously determine the depth of the liquid collecting in the reject section 116 as it passes over the weir 117 into the outlet section 121. According to one embodiment, the sensor and control unit will effectively and continuously determine the distance 201 (FIG. 2) from the sensor 200 to the upper surface of the liquid flowing over the reject section weir 117 into the outlet section. The sensor may be an ultrasonic level transducer sensor that is attached to one of the walls of the reject section 116 above the reject section weir 117 (as seen in FIG. 2) or attached to the weir 117 itself (as seen in FIG. 3). An example of a suitable sensor may be an 18 mm diameter cylindrical analog output ultrasonic sensor from Pepperl+Fuchs, model number UB300-18GM40-I-V1. Such a sensor can provide a 4-20 mA output, which can be scaled into the control unit. If the sensor 200 is attached to the weir 117 itself, such as by bracket 210 in FIG. 3, there is an advantage that, if an operator or administrator should raise or lower the height of the reject section weir 117, the reference distance between the sensor 200 and the top of the reject section weir 117 is not effected by the change in the height of the weir 117.

The control unit 202 may be in communication, for example electrical contact, with the gas source 124 and/or the gas valves 129, 130, and 131 to control the amount of gas being released from the gas supplying system 122 into the filtering chamber 100. The control unit 202 may be in communication, for example electrical contact, with the sensor 200 so as to receive signals from the sensor and process the received signals to determine the amount of reject mixture in the reject section 116. The sensor may be scaled into the control unit to continuously read the distance 201 between the sensor 200 and the surface of the reject mixture as it passes over the reject section weir 117. The control unit may also be in communication, for example electrical contact, with the automatic valve 275 to control its opening and closing to control the amount of reject that may flow through the second outlet 120.

Figure 4:
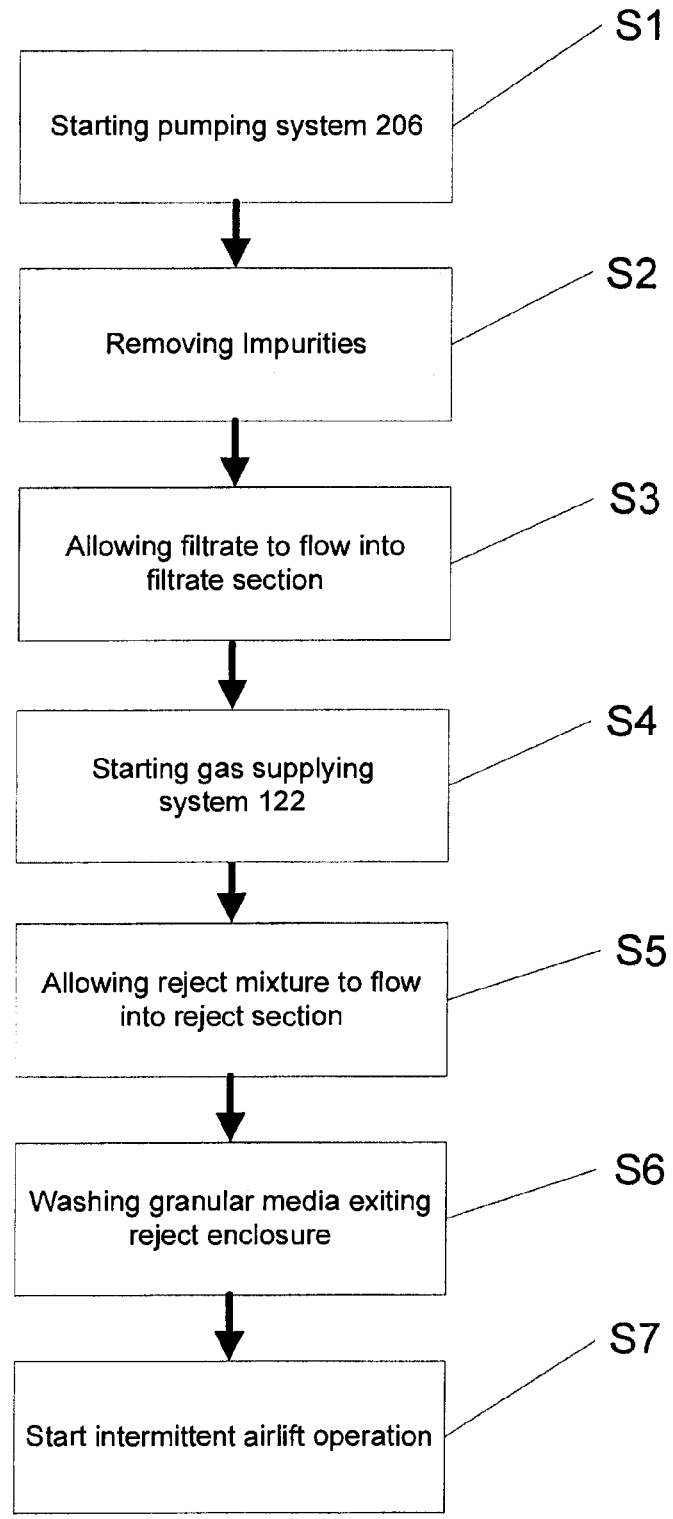
FIG. 4 shows a control method for treating a liquid containing impurities in the initial operation of the apparatus according to an embodiment of the present invention.

FIG. 4 shows a method for treating a liquid containing impurities that can be carried out by the control unit 202 in its initial operation. In step S1, the pumping system 206 is started so that there is a pumping of the liquid containing impurities into the filtering chamber 100.

In step S2, impurities are removed from the liquid to produce filtrate by interaction between the liquid and granular media in a lower portion 102 of the filtering chamber 100. The impurities are removed from the liquid by the granular media to produce the filtrate. The granular media may be sand, the liquid may be water, and the gas may be air.

In step S3, the treated liquid (or filtrate) is fed into the filtrate section 108 from the lower portion 102 of the filtering chamber 100 for subsequent outflow through the first outlet 110. There is no gas flow at the initial start up of the system, but the filtering takes place until a sensor above the weir 107 (not shown) detects a predetermined filtrate level at the weir 107 (in a similar manner as the sensor 200 above the reject section weir 117). The predetermined filtrate level may be any suitable level, such as, for example, greater than about zero (that is, filtrate starts pouring over the weir 107). Once the sensor above the weir 107 detects a predetermined filtrate level at the weir 107, the gas supplying system 122 is started in step S4 so as to deliver gas to the granular media 104 in the filtering chamber 100 through the lower gas supply line 245 to provide lift to the granular media 104 in the filtering chamber 100 to stimulate the interaction among the granular media, the liquid, and the impurities. Optionally, one or more gas bursts may first take place through the upper gas supply line 235 before initial start up of the flow of gas through the lower gas supply line 245, such as those that take place in steps S3120-S3180 of FIG. 5B (described below). With normal gas operation, the granular media 104 in the filtering chamber 100 can descend in a downward direction and the liquid in the filtering chamber 100 can flow in an upward direction such that the impurities are removed from the liquid by the granular media to produce the filtrate.

In step S5, the reject mixture containing granular media and impurities is fed into the reject section 116 from the lower portion 102 of the filtering chamber 100 via the airlift pump 132 by subjecting a portion of granular media to an airlift function and collecting a mixture containing the portion of granular media subjected to the airlift function and a portion of the liquid with impurities in the reject section 116. The reject section 116 is in fluid communication with the second outlet 120 for outflow of a portion of the reject mixture that has gone over the reject section weir 117 into the outlet section 121 in which the portion of reject mixture in the outlet section substantially comprises liquid and impurities.

In step S6, the granular media from the reject section 116 is washed by the granular media washer 134 such that washed granular media returns to the filtering chamber 100.

After a predetermined period of time (such as, for example, 20 minutes, 30 minutes, but preferably 1 hour or more), intermittent airlift operation is started in step S7. As discussed above, intermittent operation of the airlift of the dirty granular media flows upward in the airlift pump 132 is used to increase the filtering efficiency. This higher filtrate quality is achieved by the granular media bed being of a higher density due to the impurities that accumulate and are embedded into it. However, if there are too many impurities, the efficiency of the granular media bed decreases due to the granular media bed being oversaturated. Thus, the airlift operation should take place at least intermittently to prevent the granular media bed from being oversaturated with impurities while still benefiting from the Schmutzdecke Effect such that the optimal filtering efficiency of the granular media bed is achieved.

Intermittent airlift operation may result in an unacceptably high turbidity spike (or brief increase) immediately after the initial start-up of the gas flow for the airlift operation. An unacceptable level of turbidity spike upon each restart of the airlift operation may be caused by (1) blow out at the bottom of the airlift pump 132 or (2) bridging of granular media and impurities between the radial feed arms 150. Depending on the volume of filtered liquid at the top of the apparatus, it may take upwards of 30 minutes or more for the after-effect of the turbidity spike to pass.

In regard to blow out at the bottom of the airlift pump 132, compaction of the granular media 104 and the impurities within the airlift pump 132 (caused by the lack of continuous airlift operation) may cause a portion of the air to discharge out of the bottom of the airlift pump 132, rather than all exiting out of the top of the airlift pump 132 at the reject section 116, as is desired. With air discharging from the bottom of the airlift pump 132, it is believed the air released into the granular media bed will scour impurities from the granular media, and release the impurities into the filtered liquid above (the filtrate pool), thus degrading the filtrate quality.

In regard to the bridging of the granular media and impurities between the radial feed arms 150, temporary bridging of granular media and impurities between the radial feed arms (again caused by the lack of continuous airlift operation) may collapse once the weight of granular media deposited above and the void underneath (caused by the resumption of the airlift operation) becomes sufficient to create a collapse of the bridging. When such a bridge collapse occurs, the granular media undergoes a "domino effect" to the top of the granular media bed. During this effect, impurities are released from the granular media bed once the collapse reaches the top of the bed, and enters the filtrate pool up above, thus degrading the filtrate quality.

Discussion will now focus on how the apparatus 1 may address preventing an unacceptable level of turbidity spike upon each restart of the airlift operation by blow out at the bottom of the airlift pump 132. As an approach for addressing the blow out at the bottom of the airlift pump 132, the control unit 202 may control the gas flow through the upper gas supply line 235 and the lower gas supply line 245 to the granular media bed 104 in which the upper air supply line 235 has an outlet 236 that is vertically higher than the outlet 246 of the lower gas supply line 245. According to one embodiment of the present invention, the outlet 236 of the upper gas supply line 235 is located two feet higher in elevation than the outlet 246 of the lower gas supply line 245. One of ordinary skill in the art will recognize that other elevation distances between the upper and lower gas supply lines may be envisioned while remaining within the spirit and scope of the invention. For example the vertical distance between the outlets 236 and 246 may be between about 6 inches to 3 feet.

The control unit 202 is configured or programmed to first send a gas burst to the upper gas supply line 235, and then having a different gas burst sent to the lower gas supply line 245. By staggering the gas bursts through two different gas supply lines (with gas coming out of the upper gas supply line first), the resistance caused by the granular media will be less for all of the gas supplied in the gas supply lines, which will allow the gas bursts to rise up through the airlift pump 132 to the top of the apparatus 1. This way, a disruptive blast of gas out of the bottom of the airlift pump will be reduced, minimized, and/or eliminated as compared to a single gas supply line supplying all the gas.

As an approach for addressing the bridging of granular media and impurities between the radial feed arms 150, the control unit 202 may receive one or more signals from at least one or more sensors, control the gas supplying system 122, and control the operation of the automatic valve 275. The at least one sensor may be the sensor 200 positioned directly above the weir 117 of the reject section 116 in order to detect to whether a portion of the granular media is being transported properly; or a pressure transducer 265 provided above the feed pipe 146 in order to determine the current head loss for the apparatus 1. The automatic valve 275 is provided on the outlet 120 of the reject section 116, whereby the automatic valve 275 can be configured to be opened and closed at particular points in time.

Figure 5A:
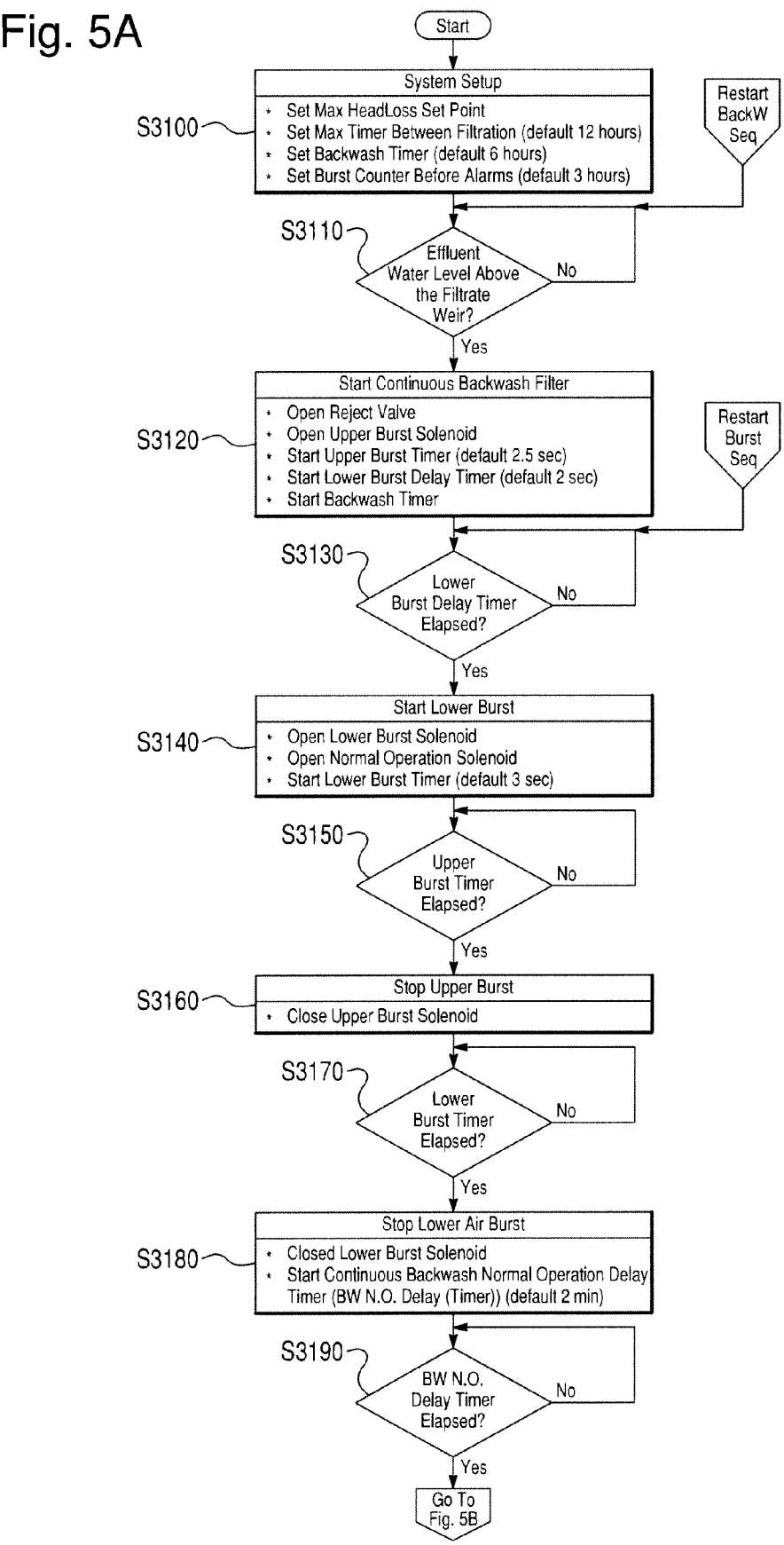
FIGS. 5A and 5B show a control method for treating a liquid containing impurities according to an embodiment of the present invention.
Figure 5B:
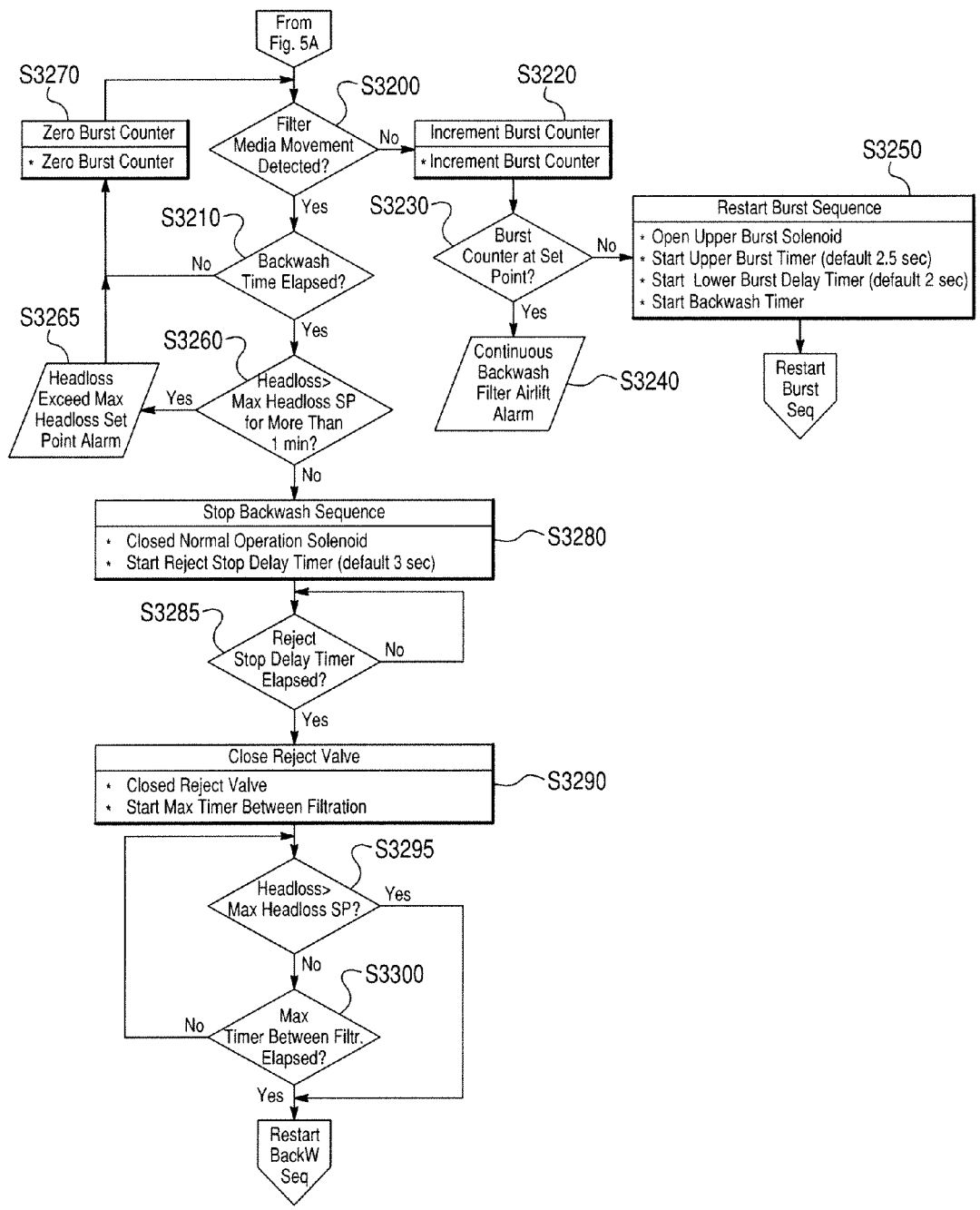

FIGS. 5A and 5B show a control method for treating a liquid containing impurities that incorporates the above approaches for reducing blow out at the bottom of the airlift pump 132 and reducing bridging of granular media and impurities between the radial feed arms 150. FIGS. 5A and 5B correspond to a flowchart showing the operation of a control (e.g., performed by a computer running a computer program stored on a computer readable medium such as a compact disc), for providing the airbursts to provide for a better (e.g., lower) reject rate as compared to conventional water treatment units. In step S3100, a system setup is performed, whereby values are set for the maximum head loss (max_headloss_set_point, the default setting can be, for example, 30 to 36 inches of water for a two meter tank; the default setting can be, for example, 24 to 30 inches of water for a one meter tank; but the set point can be any suitable value, such as between 10 inches of water and 48 inches of water), the maximum time between filtration (e.g., the default setting can be 12 hours, but the value can be, for example, between 1 hour and 48 hours), the backwash timer (e.g., the default setting can be 6 hours, but the value can be, for example, between 30 minutes and 12 hours), and the burst counter before alarms (e.g., the default setting can be 3, but the value can be, for example, between 2 and 10). These values are set by an operator or administrator of the apparatus 1, and can be entered via a computer keyboard or mouse, or by other input mechanisms. During steps S3100-S3110, steps S1, S2, and S3 from FIG. 4 are carried out.

In step S3110, a determination is made as to whether or not the effluent water level is above the weir 107. If No, then the process is not required to operate, and the process flow loops back to the start of step S3110 (this determination is made periodically, such as every 10 seconds). If Yes, then the process flow goes to step S3120, to start backwash filtering (that is, starting the airlift operation such that dirty granular media flows upward in the airlift pump 132 towards the reject section 116). In step S3120, the automatic valve 275 is opened, the valve 129 (which can be an upper burst solenoid) is opened to enable gas bursts to flow into the upper gas supply line 235, and a first timer 237, a second timer 247, and a third timer 250 are started. The gas burst may be a short-timed gas burst of high pressure and/or high flow of a value that is higher than what is required for normal operation. According to one embodiment, the gas pressure of the gas burst may be in the range of about 10-100 psi, preferably in a range of about 20-40 psi, but any suitable gas pressure may be used based on the amount of granular media and other operating and design considerations. As shown below, the duration of the burst of gas may be varied by the operator or administrator, but a suitable range may be from about three to sixty seconds.

The first, second, and third timers can be incorporated into the control unit. The first timer 237 may be an upper burst timer which tracks the amount of time gas bursts flow through the upper gas supply line 235. The default setting of the first timer 237 may be 2.5 seconds, but the operator or administrator may be able to change this setting to any suitable time (for example, between 1 second and 10 seconds). The second timer 247 may be a lower burst delay timer which tracks the amount of time before gas burst flow through the lower gas supply line 245. The default setting of the second timer 247 may be 2 seconds, but the operator or administrator may be able to change this setting to any suitable time (for example, between 1 second and 10 seconds). The third timer 250 may be a backwash timer which tracks the amount of time lapsed during the start of the airlift operation.

In step S3130, a determination is made as to whether or not the second (lower burst delay) timer 247 has elapsed. If No, the process flow loops back to the start of step S3130 (this determination is made periodically, such as, for example, every 10 milliseconds). If Yes, then the process flow goes to step S3140, to start the gas burst flow in the lower gas supply line 245. In step S3140, the valve 130 (which can be a lower air burst solenoid) is operated to enable gas bursts to flow into the lower gas supply line 245, and the valve 131 (which can be a normal operation solenoid) is operated to enable continuous gas flow into the lower gas supply line 245 during normal airlift operation, and a fourth timer 251 is started. The gas burst may be a short-timed gas burst of high pressure and/or high flow of a value that is higher than what is required for normal operation. According to one embodiment, the gas pressure of the gas burst may be in the range of about 10-100 psi, preferably in a range of about 20-40 psi, but any suitable gas pressure may be used based on the amount of granular media and other operating and design considerations. The fourth timer may be a lower burst timer which tracks the amount of time gas flows through the lower gas supply line 245. The default setting of the fourth timer 251 may be about 3 seconds, but the operator or administrator may be able to change this setting to any suitable time (for example, between 1 second and 10 seconds).

In step S3150, a determination is made as to whether or not the first (upper burst) timer 237 has elapsed. If Yes, then the process flow goes to step S3160, whereby the valve 129 is closed to stop the gas flow through the upper gas supply line 235. If No, the process flow loops back to the start of step S3150 (this determination is made periodically, such as, for example, every 10 milliseconds).

In step S3170, a determination is made as to whether or not the fourth (lower burst) timer 251 has elapsed. If Yes, then the process flow goes to step S3180, whereby the valve 130 is closed to stop the gas bursts flow through the lower gas supply line 245, and whereby a fifth timer 252 is started. The fifth timer 252 may be a continuous backwash normal operation delay timer, which tracks the amount of time before a determination is made about whether a portion of the granular media is being properly transported through the airlift pump 132. The default setting of the second timer 251 may be 2 minutes, but the operator or administrator may be able to change this setting to any suitable time (for example, between 10 seconds and 5 minutes). If No in step S3170, the process flow loops back to the start of step S3170 (this determination is made periodically, such as, for example, every 10 milliseconds).

In step S3190, a determination is made as to whether or not the fifth (continuous backwash normal operation delay) timer has elapsed. If No, the process flow loops back to the start of step S3190 (this determination is made periodically, such as, for example, every 10 milliseconds). If Yes, the process flow proceeds to step S3200.

In step S3200, a determination is made as to whether or not appropriate filter media movement (such as, whether a portion of the granular media is being properly transported through the airlift pump 132 by the airlift operation or whether appropriate lift is being provided to the granular media such that a portion of the granular media is transported through the airlift pump 132) has been detected during normal airlift operation of the granular media in the airlift pump 132. By way of example and not by way of limitation, the filter media movement is detected by the sensor 200 located directly above the reject section weir 117. According to one embodiment of the present invention, the control unit 202 is configured to determine whether the granular media is being appropriately lifted or properly transported in the airlift pump 132 by comparing a sensor reading from the sensor 200 to a predetermined threshold. An "appropriate lift" or "proper transportation" can be the amount of lift provided by the gas supplying system to the bed of granular media such that the release of excessive amounts of impurities into the filtrate (that is, breakthrough) is avoided. Examples of appropriate lift or proper transportation can include operation of the gas supplying system 122 such that a pressure differential between the top and bottom of the bed of granular media is within a predetermined range (such as 10, 15, 20, 30 inches of water or any integer therebetween).

The control unit may be configured to determine that an appropriate lift is not being provided (or the granular media is not being properly transported) by the gas supplying system 122 when a level of the reject mixture passing over the weir 117 is above a predetermined threshold. The threshold may be some predetermined distance from the sensor. According to one embodiment, the threshold may be a vertical distance from the sensor to an acceptable level of reject mixture passing over the top of the weir 117 or the like.

If the answer is Yes to step S3200, then the process flow proceeds to step S3210. If No, then the process flow proceeds to step S3220. In step S3220, a burst counter value is incremented by one and the process flow proceeds to step S3230. In step S3230, a check is made as to whether or not the burst counter value has reached a set point or predetermined value (for example, the default setting can be 6, but the value can, for example, be between 3 and 10). If Yes, then an alarm 204 is operated in step S3240 to inform an operator or administrator that the airlift operation has failed to properly transport the granular media through the airlift pump 132. The alarm 204 may be a continuous backwash filter airlift alarm in the form of an audible alarm and/or a visual alarm. If the answer is No step S3230, then the process flow proceeds to step S3250, to restart the gas burst sequence in a corrective measure to unclog the movement of the granular media by instituting air bursts through the upper and lower gas supply lines 235 and 245. In step S3250, the valve 129 is opened, the first (upper burst) timer 237 is started (the default setting can be 2.5 seconds, but the value can, for example, be between 1 second and 10 seconds), the second (lower burst delay) timer 247 is started (the default setting can be 2 seconds, but the value can, for example, be between 1 second and 10 seconds), and the third (backwash) 250 timer is started. After step S3250, the process flow proceeds back to step S3120.

By setting the burst counter value to a predetermined set point value, such as 6, when the airlift operation stops functioning to properly transport the granular media through the airlift pump 132 (when it should be doing so), the dual-burst airlift operation through the upper and lower gas supply lines 235 and 245 will be repeated up to a maximum of 5 more times (the default setting can be, for example, 6 total cycles but can be set for a different number, such as between 3 cycles and 10 cycles). If the airlift operation is still not functioning normally (as determined based on signals provided by the sensor 200 positioned directly over the weir 117 of the reject section 116 as shown in FIG. 2 or 3), an alarm 204 will be output (in step S3240), to thereby inform an operator or administrator of the failure, and that further corrective action is required.

In step S3210, a check is made as to whether or not the third (backwash) timer 250 has elapsed. If Yes, the process flow proceeds to step S3260, and if No, the process flow proceeds to step S3270. In step S3270, the burst counter is zeroed-out, and the process flow then proceeds to step S3200. In step S3260, a check is made as to whether or not the head loss exceeds the maximum head loss set point value for more than a predetermined time amount (e.g., 1 minute but can be any suitable time such as between 5 seconds and 2 minutes). By way of example and not by way of limitation, the head loss may be measured by (1) the pressure transducer 265 provided on the influent pipe 146 and comparing the value to a value measured by a second pressure transducer 266 provided on the outlet pipe 140; (2) a differential pressure transmitter measuring the differential pressure between the influent pipe 265 and the outlet pipe 140; (3) measuring the differential in level transmitters located on the feed pipe 265 and the filtered water weir 107; or other similar measurement configurations.

If the head loss exceeds the maximum head loss set value, then the process flow proceeds to step S3265, whereby an alarm is output to inform a user that the head loss exceeds the maximum head loss value, and then the process flow proceeds to step S3270, in which the burst counter is zeroed-out, and then the process flow proceeds back to step S3200. If the head loss does not exceed the maximum head loss set value for more than the predetermined time amount, then the process flow proceeds to step S3280, to stop the backwash sequence. In step S3280, the valve 131 is closed, and a sixth timer 253 is started. The sixth timer 253 may be a reject stop delay timer with a default setting of 2 minutes, but the operator or administrator may be able to change this setting to any suitable time (such as, for example, between 3 seconds and 5 minutes).

In step S3285, a determination is made as to whether or not the sixth (reject stop delay) timer 253 has elapsed. If No, the process flow loops back to the start of step S3285 (this determination is made periodically, such as, for example, every 10 milliseconds). If Yes, the process flow proceeds to step S3290, to close the automatic valve 275. During steps S3120-S3280, steps S4, S5, and S6 from FIG. 4 are carried out. At step S3285, step S7 from FIG. 4 (that is, intermittent airlift operation) is carried out.

In step S3290, the automatic value 275 is closed, and a max timer 254 between filtration is started. The max timer 254 may have a default setting of 12 hours, but the operator or administrator may be able to change this setting to any suitable time (such as, for example, between 30 minutes and 48 hours). In step S3295, a determination is made as to whether or not the head loss exceeds the maximum head loss set point value. If Yes, the process flow proceeds back to step S3120. If No, the process flow proceeds to step S3300, in which a determination is made as to whether or not the max timer 254 between filtration has elapsed. If the determination in step S3300 is No, the process flow proceeds back to step S3295. If the determination in step S3300 is Yes, the process flow proceeds back to step S3120. At step 3120, the gas flow to operate the airlift function is restarted. The valves 275 and 129 are opened, the first (upper burst) timer 237 is started, the second (lower burst delay) timer 247 is started, and the third (backwash) 250 timer is started. After step S3120, the process flow proceeds to step S3110.

From the process of FIGS. 5A and 5B, it can be seen that the initiation, maintenance, or termination of gas flow may be carried out either at predetermined times; in response to an outcome of a determination of whether the portion of the granular media is being transported properly; or based on the head loss in the filter. If the initiation, maintenance, or termination of gas flow is carried out in response to an outcome of a determination of whether the portion of the granular media is being transported properly, the determination may be based on an amount of reject mixture in the reject section in which the amount of reject mixture in the reject section is determined with the valve open at step S3200 and the amount of the reject mixture in the reject section is based on a level of reject mixture flowing over the reject weir 117. Also, control unit 202 controls the gas supplying system 122 to deliver gas to the granular media 104 at one or more intervals sufficient to inhibit or prevent bridging of the granular media across adjacent feed arms 150 in which the one or more intervals is determined by the sensor 265 that determines head loss between the feed line and the first outlet 110 or by the sensor 200 that determines an amount of reject mixture in the reject section 116 by a level of liquid flowing over the reject weir 117 or by a predetermined time interval.

Figure 6:
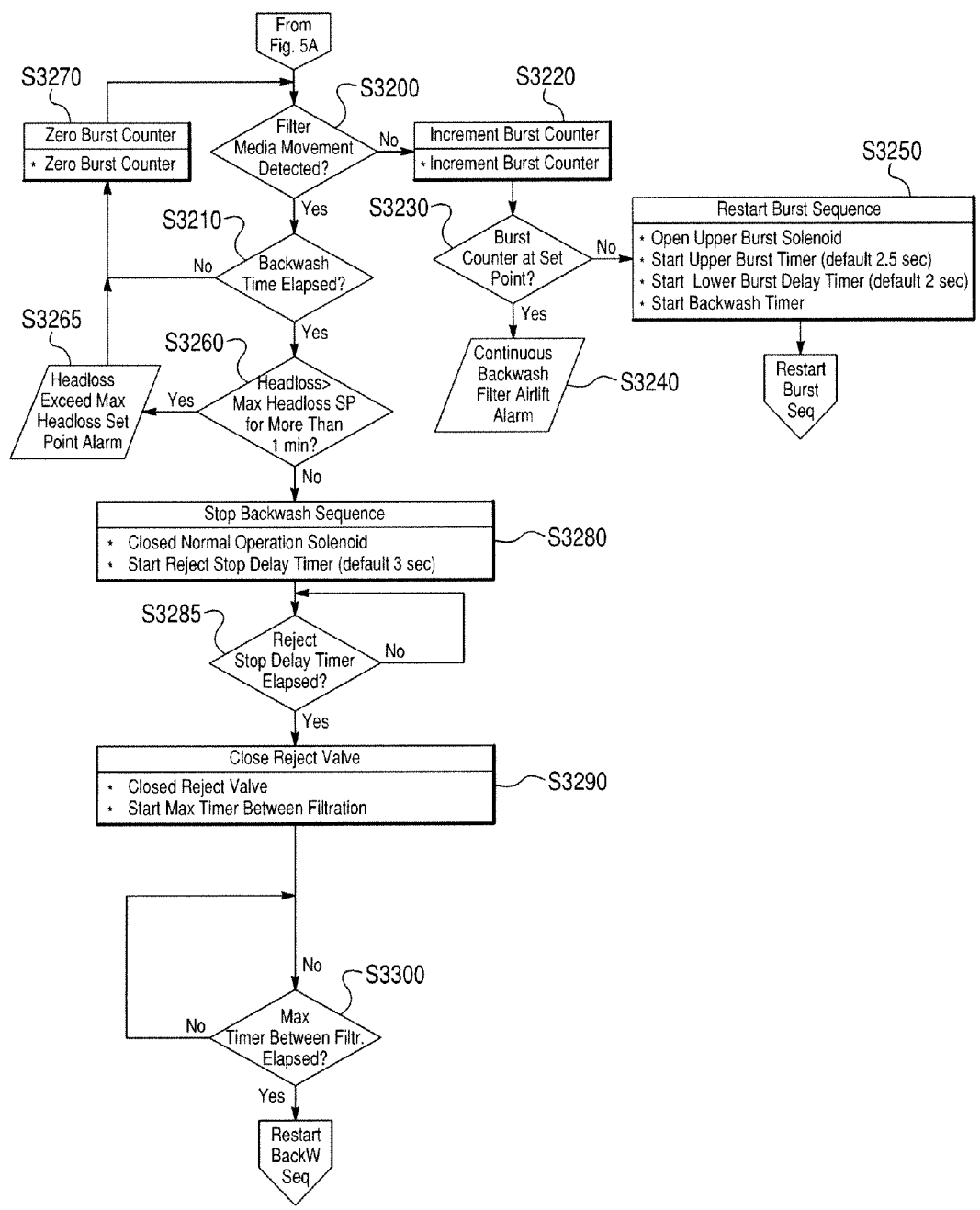
FIG. 6 shows an alternative process of a control method for treating a liquid containing impurities according to an embodiment of the present invention.
Figure 7:
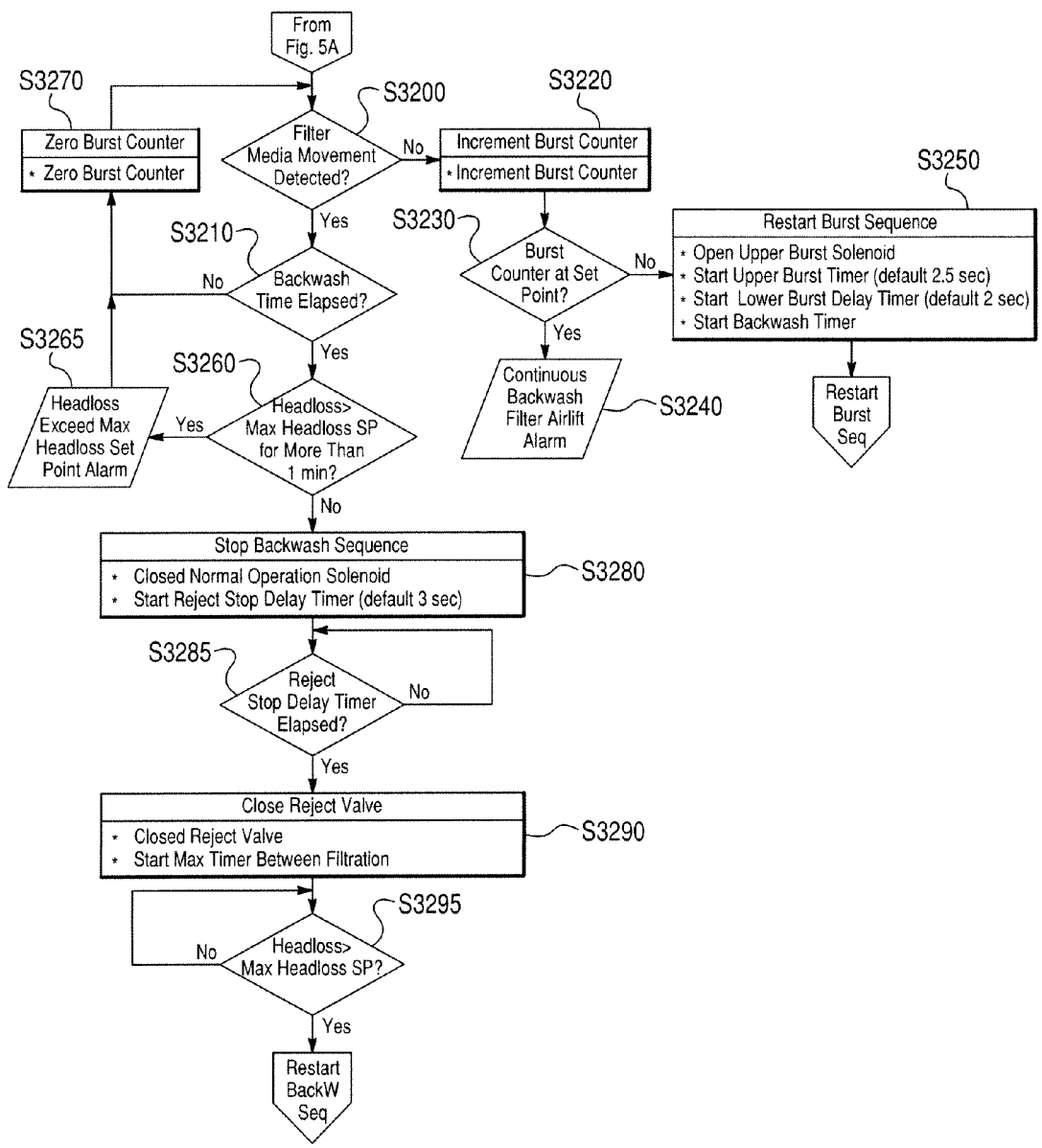
FIG. 7 shows an alternative process of a control method for treating a liquid containing impurities according to an embodiment of the present invention.

According to alternate embodiments, either step S3295 or step S3300 may be removed from the process of FIG. 5B. For example, FIG. 6 shows an alternative process to FIG. 5B which is the same as FIG. 5B except step S3295 is removed. In this process, the max timer 254 would be set at a predetermined time cycle such that the possibility of bridging of the granular media and impurities to form bridges between the radial feed arms 150 would be reduced, minimized, or eliminated. Thus, the control unit 202 controls the gas supplying system 122 to deliver gas to the granular media 104 at one or more intervals sufficient to inhibit or prevent bridging of the granular media across adjacent feed arms 150. The intermittent operation of the gas supplying system 122 may be predetermined so as to be sufficient to inhibit or prevent bridging of the granular media 104 across adjacent feed arms 150 in which the control unit 202 includes a timer that tracks one or more time intervals between the intermittent operations of the gas supplying system 122 and the one or more time intervals is sufficiently short to inhibit or prevent bridging of the granular media across adjacent feed arms. Alternatively, FIG. 7 shows an alternative process to FIG. 5B which is the same as FIG. 5B except step S3300 is removed. This process would result in an intermittent airburst that relies on the rise in head loss without an automatic restart of airlift operation.

The default values (e.g., timer values and count values) for the variables described above are for an exemplary implementation of this embodiment, whereby one of ordinary skill in the art will recognize that other values may be envisioned for these variables, while remaining within the spirit and scope of the invention.

The control unit 202, which carries out the process of FIGS. 5A and 5B, may be constituted by a microcomputer comprising a central processing unit (CPU), a read-only memory (ROM), a random access memory (RAM), an input/output interface (I/O interface), a counter, and one or more timers. Alternatively or additionally, the control unit may be constituted by a plurality of microcomputers. The control unit 202 comprises the necessary hardware and/or software to carry out its functions disclosed herein. For example, the software may be stored on a tangible memory device, such as a DVD or a CD-ROM, which is accessible by the control unit 202.

Figure 8:
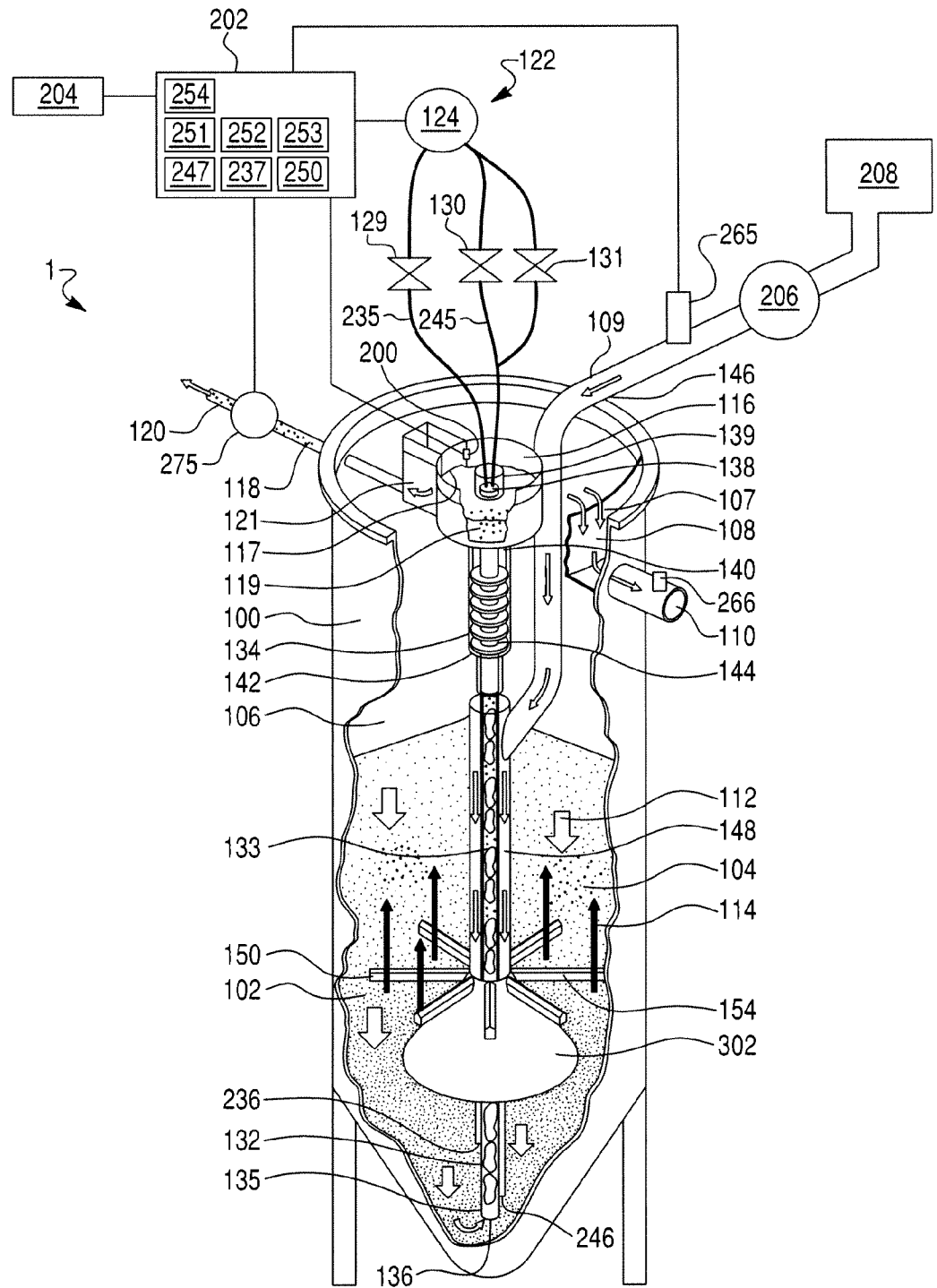
FIG. 8 shows a schematic drawing of an apparatus for treating a liquid containing impurities according to another embodiment of the present invention.
Figure 9D:
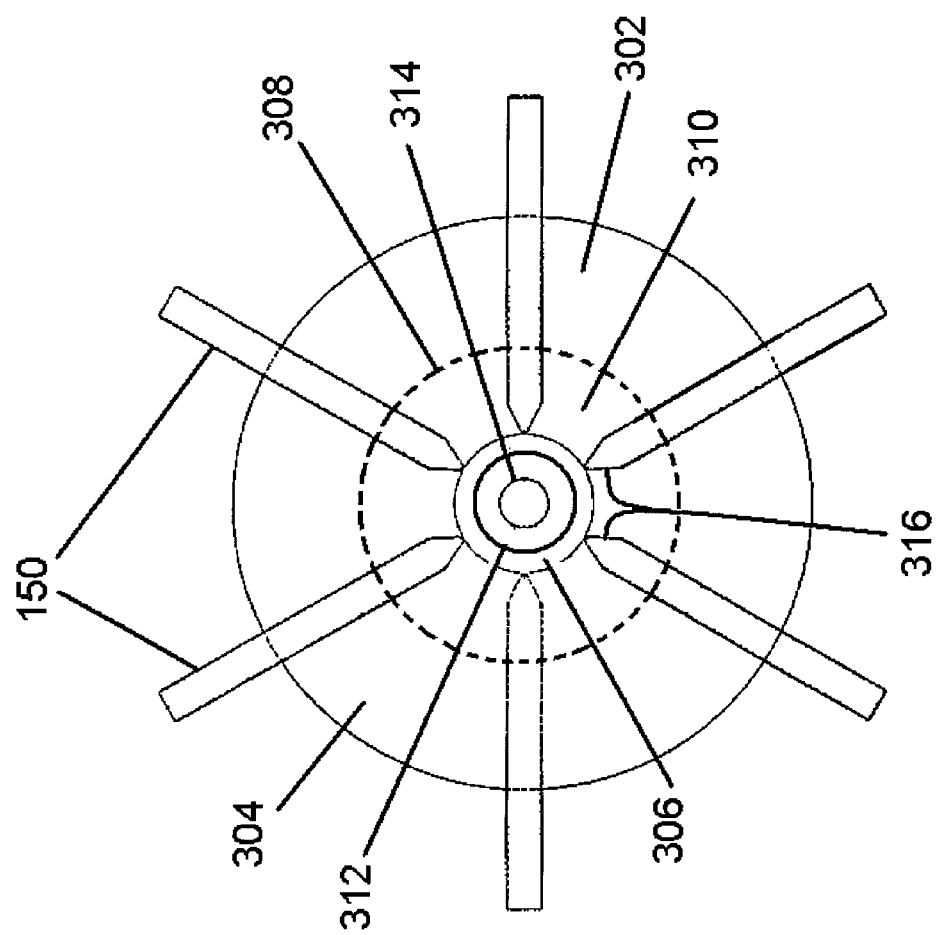

Besides the above-described approach using the control unit 202 to receive one or more signals from at least one sensor, to supply the gas supplying system 122, and to control the operation of the automatic valve 275, a second approach may be used for addressing the bridging of granular media and impurities between the radial feed arms 150, involving the use of one or more cutting edges 152 on the top of each radial feed arm 150 to better "slice" through the impurity-laden media, which will reduce the likelihood that the bed will bridge on the radial feed arms. The cutting edges 152 may be each formed by the intersection of two planar surfaces. The two planar surface may meet at an angle ranging from about 10 degrees to about 90 degrees, preferably from about 65-70 degrees. As shown in FIG. 1, some or each of the edges may comprise an edge of an angular prism, such as a triangular prism. According to another embodiment of the present invention, as shown in FIG. 8, the edges may comprise one or more knife-edge gussets 154. Other types of cutting edges are also contemplated, such as serrated edges, continuous blade edges along each radial feed arm, and/or a plurality of discrete edges inline with each other along each radial feed arm.

The cutting edges 152 may also take other forms. For example, the cutting edges may be each formed by the intersection of two arc-shaped concave surfaces meeting at a tip. According to another embodiment, the cutting edges may be formed by the intersection of two arc-shaped convex surfaces that form an upside-down "tear-drop" shape. Other configurations are also contemplated.

Figure 12:
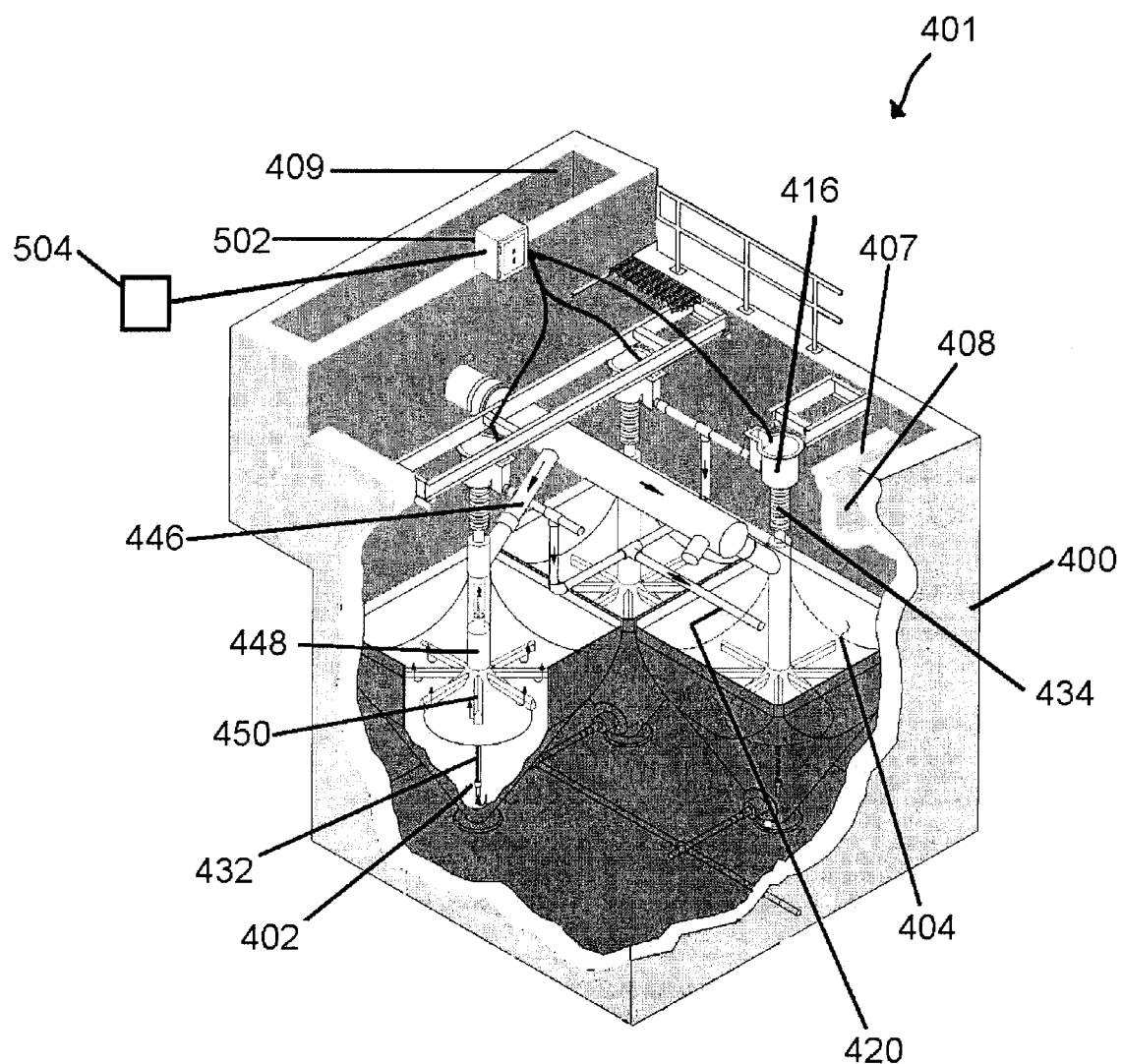
FIG. 12 shows a schematic drawing of an apparatus for treating a liquid containing impurities according to another embodiment of the present invention.

FIG. 12 shows an apparatus 401 for treating a liquid containing impurities according to another embodiment of the present invention. The apparatus 401 may comprise a filtering chamber 400 for accepting the liquid containing impurities, a filtrate section 408, a reject section 416, a gas supplying system (not shown), a control unit 502, and an alarm 504.

The filtering chamber 400 includes a lower portion 402 in which granular media 404 removes the impurities from the liquid to produce filtrate. The filtering chamber 400 of FIG. 5 has a rectangular cross-sectional shape in its upper portion while the lower portion 402 comprises a plurality of conical shapes. Of course, the filtering chamber may be any suitable shape (such as, circular, triangular, or other polygonal or non-polygonal shape) or size and the conical shapes may be any suitable shape (such as, pyramidal) or size. Also, the number of conical shapes may be any suitable number, such as two, three, four, or more. The filtering chamber 400 may be in fluid communication with a first inlet 409 for inflow of influent or liquid containing impurities.

The first inlet 409 may be in fluid communication with a liquid source (such as a reservoir) which contains liquid containing impurities. The liquid may be wastewater or water with impurities. Impurities may be any undesired material, such as dirt, waste products, oil, grease, or other solid, semi-solid, semi-liquid, or liquid contaminants. A pumping system can be used to channel the liquid from the liquid source to the first inlet 409 in which the pumping system contains all the necessary equipment to initiate and maintain for the fluid flow between the liquid source and the filtering chamber 400, such as a pump, a control valve, and/or piping or tubing. The first inlet 409 may comprise liquid feed line with a feed pipe 446 and an annular pipe 448 for each conical shape and radial feed arms or pipes 450 for each conical shape. The influent or liquid containing impurities is introduced at the top of each feed pipe 446 and flows downward through each annular pipe 448 around an airlift pump 432. Each annular pipe 448 is sealed at its top end and is in fluid communication with its corresponding radial feed arms 450 such that the liquid is introduced into the bottom of the bed of granular media in each conical shape through the series of radial feed arms 450 that are open or have individual openings along their longitudinal lengths on the sides facing toward the bottom of the filtering chamber 400 (that is, downward in FIG. 12). Other configurations for the inlet are contemplated, as previously mentioned in relation to the embodiment of FIG. 1.

The granular media 404 in the filtering chamber 400 can descend in a downward direction and the liquid in the filtering chamber 400 can flow in an upward direction such that the impurities are removed from the liquid by impacting the granular media to produce filtrate at the top of the granular media 404.

The filtrate section 408 may be in fluid communication with the lower portion 402 of the filtering chamber 400 (that is, each conical shape) for receiving the filtrate that has passed through the granular media 404. According to one embodiment, the filtrate section 408 comprises a weir 407. The filtrate that has emerged at the top portion of the filtering chamber 400 pours over the weir 407 and into the filtrate section 408. The filtrate section 408 may be in fluid communication with a first outlet for outflow of effluent or the filtrate. The first outlet may be piping, tubing, or connections in which piping or tubing may be connected.

Reject sections 416 may be in fluid communication with the lower portions 402 of the filtering chamber 400 (that is, each conical shape) for receiving a reject mixture containing granular media and impurities. The reject sections may be a plurality of reject sections 416, one for each conical shaped lower portion 402. The fluid communication can be configured such that each reject section 416 is in fluid communication with a corresponding airlift pump 432 residing in each conical shape. The airlift pump 432 is a structure, such as a cylindrical pipe or tube, that may be disposed in an airlift housing, which (in turn) is disposed inside its corresponding annular pipe 448. As the granular media 404 in the filtering chamber 400 descends in the downward direction such that the impurities are removed from the liquid by the granular media 404, near the bottom of each conical shape, a small volume of compressed gas (such as air, nitrogen, oxygen, or the like) is introduced at the bottom of each conical shape by the gas supplying system so as to draw the granular media by airlift operation into each airlift pump 432 at the bottom end of each airlift pump 432. By operation of the gas, the scouring in the airlift pump dislodges any impurities attached to the granular media. The reject mixture of granular media and dislodged impurities (which form a dirty slurry) is pushed to the top end of each airlift pump 432 and into its corresponding reject section 416.

Each reject section 416 may comprise an inlet section and an outlet section that are isolated from each other by a weir, similar to that shown in FIG. 1. The reject mixture that has emerged from each airlift pump 432 at the top end of each airlift pump 432 fills up the inlet section of each reject section 416 until a portion of the reject mixture pours over its corresponding weir into the outlet section of the reject section. The outlet section of each reject section 416 may also be in fluid communication with a second outlet 420 for outflow of the portion of the reject mixture that has poured over the weir. The second outlet 420 may be a piping, tubing, or a connection in which piping or tubing may be connected. The second outlet 420 may be connected to an automatic valve which is controlled and operated in a similar fashion as the automatic valve 275 in FIG. 1.

The inlet section of each reject section 416 is also in fluid communication with a corresponding granular media washer 434. Each granular media washer has a granular media inlet, a granular media outlet, and concentric stages, similar to that shown in the embodiment of FIGS. 1 and 2. From each reject section 416, the granular media falls into its corresponding granular media washer 434 via the granular media inlet and the lighter reject impurities that were dislodged from the granular media flow are eventually poured over the weir and out the second outlet 420. The granular media cascades down through the concentric stages of each granular media washer 434. The concentric stages may simply comprise spiral flights around its corresponding airlift pump 432. As the granular media is cascading down the concentric stages, it encounters a small amount of filtrate moving upward through each washer 434 from the granular media outlet. This filtrate in the washers 434 is driven by the difference in liquid level between the filtrate pool in the filtering chamber 400 and the reject section 416. The heavier, coarser granular media flows through this small counter current flow while the remaining impurities are carried back up to the reject sections 416. The washed granular media returns to the filtering chamber and is deposited on the top of its corresponding granular media bed where it once again begins the influent cleaning process and its eventual migration to the bottom of the filtering chamber 400 (that is, the conical shapes).

The gas supplying system may be provided for delivering gas to the granular media 404 in the filtering chamber 400 to transport a portion of the granular media 404, through the airlift pumps and reject section to the granular media washers. The gas supplying system may comprise a gas source, a gas line in fluid communication with the gas source, and a gas inlet attached to each conical shape of the filtering chamber 400. The gas source may be a fan, a gas pump, a pressurized cylinder of gas, or some other suitable source of gas. The gas source may also be within the housing of the filtering chamber or the gas source may be directly connected to the gas inlet. The gas being introduced into the filtering chamber 400 by the gas source may be air, nitrogen, oxygen, or some other suitable gas. Similar to the arrangement shown in FIG. 1, the gas supplied to each conical shape may have delivered in two separate paths that terminate at the lower portion of each conical shape in which one of the two separate paths terminates at an upper position in the lower portion and the other of the two separate paths terminates at a lower position in the lower portion of the filtering chamber, the upper position being above the lower position. The control unit 502 is configured to independently initiate, maintain, or terminate gas flowing through each pair of paths of the gas supplying system in the manner described with regard to the embodiment shown in FIG. 1.

A sensor may be provided for determining a level of reject mixture in each reject section 416 and a control unit 502 may be provided to control the gas supplying system and to receive one or more signals from the sensors. The combination of the sensor and control unit can be configured to effectively and continuously determine the distance between the sensor and the liquid (the reject mixture) passing over the weir of its corresponding reject section. According to one embodiment, the sensor and control unit will effectively and continuously determine the distance between the sensor and the surface level of the liquid flowing over one of the reject section weirs. The sensor may be an ultrasonic level transducer sensor that is attached to one of the walls of one of the reject sections 416 above its corresponding reject section weir 417 or attached to the corresponding the weir 417 itself. An example of a suitable sensor may be an 18 mm diameter cylindrical analog output ultrasonic sensor from Pepperl+Fuchs, model number UB300-18GM40-I-V1. The control unit 502 may be in communication, for example electrical contact, with the gas source and/or the gas valves to control the amount of gas being released from the gas supplying system into the filtering chamber 400. The control unit 502 also is in communication, for example electrical contact, with each sensor so as to receive signals from the sensors and process the received signals to determine the amount of reject mixture passing over the weir of its corresponding reject section 416. For example, the sensor may provide output, which can be scaled into the control unit to continuously read the current distance between the sensor and the liquid (reject mixture) passing over the reject section weir. From the determined amount of reject mixture in the section, the control unit 502 is then configured to determine whether the portion of the granular media being sent through the airlift pump and rejection section is being properly transported to the granular media washer by the gas supplying system for each conical shape.

The control unit 502 may operate according to the process shown in FIGS. 5A-5B, the process of FIGS. 5A and 6, or the process of FIGS. 5A and 7. If there is a determination that there is no appropriate filter media movement (such as, a portion of the granular media is not being properly transported through the airlift pump 432 by the airlift operation or appropriate lift is not being provided to the granular media such that a portion of the granular media is transported through the airlift pump 432) in one or more of the airlift pumps (step S3200 in FIG. 5B, 6, or 7), the control unit 502 may proceed to take corrective measures as outlined in steps S3220, S3230, S3240, and S3250 in FIG. 5B, 6, or 7 for either the failing airlift pump or, alternatively, all the airlift pumps.

The control unit 502, which carries out the process of FIGS. 5A and 5B (or FIGS. 5A and 6 or FIGS. 5A and 7), may be constituted by a microcomputer comprising a central processing unit (CPU), a read-only memory (ROM), a random access memory (RAM), an input/output interface (I/O interface), a counter, and one or more timers. Alternatively or additionally, the control unit may be constituted by a plurality of microcomputers. The control unit 502 comprises the necessary hardware and/or software to carry out its functions disclosed herein. For example, the software may be stored on a tangible memory device, such as a DVD or a CD-ROM, which is accessible by the control unit 502.

Furthermore, each conical shape may have radial feed arms such as those shown in FIG. 1 or FIG. 8 and may have a channeling section such as that shown in FIGS. 9A-9D or FIGS. 10A-10C.

Besides those embodiments depicted in the figures and described in the above description, other embodiments of the present invention are also contemplated. For example, any single feature of one embodiment of the present invention may be used in any other embodiment of the present invention. For example, the apparatus for treating a liquid containing impurities, may comprises any of the following features in any combination:

(1) a filtering chamber for receiving liquid containing impurities, the filtering chamber including a lower portion containing granular media and configured to permit the granular media to interact with the liquid containing impurities, thereby removing impurities from the liquid to produce filtrate;

(2) a filtrate section in fluid communication with the filtering chamber for receiving the filtrate, the filtrate section being in fluid communication with a first outlet for outflow of the filtrate;

(3) a gas supplying system for delivering gas to the granular media in the filtering chamber for transport of a portion of the granular media to a granular media washer;

(4) a reject section in fluid communication with the granular media washer for receiving a reject mixture comprising liquid and impurities from the granular media washer, the reject section being in fluid communication with a second outlet for outflow of a portion of the reject mixture;

(5) a valve disposed at the second outlet;

(6) a control unit that is configured to: (i) determine whether the portion of the granular media is being transported properly; (ii) control the gas supplying system; and (iii) control the valve;

(7) the control unit configured to open the valve to allow outflow of a portion of the reject mixture or to close the valve to preclude outflow of a portion of the reject mixture;

(8) the control unit being configured to initiate, maintain, or terminate gas flow from the gas supplying system in which the initiation, maintenance, or termination of gas flow is carried out either at predetermined times or in response to an outcome of a determination of whether the portion of the granular media is being transported properly;

(9) the determination of whether the portion of the granular media is being transported properly being based on an amount of reject mixture in the reject section in which the amount of reject mixture in the reject section is determined with the valve open and/or the amount of the reject mixture in the reject section being based on a level of reject mixture flowing over a reject weir;

(10) the airflow comprising a steady flow of gas, a burst of gas, or a combination thereof in which the airflow comprises a burst of gas having a duration ranging from three to sixty seconds;

(11) the gas supplying system comprising at least two separate paths for supplying gas in which the at least two separate paths terminate at the lower portion of the filtering chamber and/or one of the at least two separate paths terminates at an upper position in the lower portion of the filtering chamber and the other of the at least two separate paths terminates at a lower position in the lower portion of the filtering chamber, the upper position being above the lower position;

(12) the control unit being configured to independently initiate, maintain, or terminate gas flowing through each of the at least two separate paths of the gas supplying system;

(13) a plurality of feed arms in fluid communication with the liquid feed line, which extend radially in the lower portion of the filtering chamber, for feeding liquid to the granular media through one or more openings along each feed arm, a top of each feed arm presenting one or more cutting edges;

(14) a control unit that is configured to: (i) receive one or more signals from at least one sensor; (ii) control the gas supplying system; and (iii) control the valve;

(15) one or more openings being located along a bottom of each feed arm;

(16) a top of each feed arm presenting one or more edges in which each edge is formed by two planar surfaces meeting at an angle ranging from 10 to 90 degrees and/or the one or more edges is provided by one or more gussets;

(17) a top of each feed arm presenting one or more edges in which each edge comprises an edge of an angular prism and/or the angular prism comprises a triangular prism;

(18) the control unit controlling the gas supplying system to deliver gas to the granular media at one or more intervals sufficient to inhibit or prevent bridging of the granular media across adjacent feed arms in which the one or more intervals is determined by a sensor that determines head loss between the feed line and the first outlet and/or the one or more intervals is determined by a sensor that determines an amount of reject mixture in the reject section in which the amount of reject mixture in the rejection section is determined by a level of water flowing over a reject weir;

(19) an annular space in fluid communication with the liquid feed line and the plurality of feed arms, the annular space equipped with a bottom plate having a plurality of openings in which each of the plurality of openings are positioned between adjacent feed arms and/or each of the plurality of openings are semicircularly shaped and/or each of the plurality of openings comprises eye-shaped cutouts and/or each of the plurality of openings empties into a conical space at a lower portion of the filtering chamber;

(20) an airlift pump through which the portion of the granular media is transported in which the airlift pump passes through a central portion of the conical space;

(21) the gas supplying system being operated intermittently in which the intermittent operation of the gas supplying system being sufficient to inhibit or prevent bridging of the granular media across adjacent feed arms; and

(22) the control unit including a timer that tracks one or more time intervals between the intermittent operations of the gas supplying system in which the one or more time intervals are sufficiently short to inhibit or prevent bridging of the granular media across adjacent feed arms.

The above-disclosed systems and methods may provide one or more of the following advantages: reduce the amount of reject produced (estimated 10-90%); reduce the amount of compressed gas flow (estimated to be 50-90% savings); reduce wear and tear on the gas supplying system, such as, for example, an air compressor system (estimated to be 50-90% savings); reduce wear and tear on the airlift pump (estimated to increase life by two to nine times); reduce electrical/energy consumption (estimated to be 50-90% savings); improve filtrate quality; reduce chemical consumption and cost (in some cases, perhaps up to 100%); prevent of air from blowing out of the bottom of the airlift pump during initial gas delivery; prevent or minimize the bridging of impurity-laden granular media across feed arms; provide an automatic check and restart of airlift operation, if needed; reduce routine inspection of the airlift function (estimated 90% reduction); and reduced labor to correct failed airlift operations (estimated 99% reduction).

The above-disclosed system and computer-implemented method provides immediate automatic detection and correction to failed airlift operations in the granular media bed in a granular media filter so as to maintain continuous and reliable airlift operation. Also, such immediate and automatic detection and correction may significantly reduce the required vigilance and labor which is currently required by on-site personnel.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An apparatus for treating a liquid containing impurities, comprising:
   a filtering chamber for receiving liquid containing impurities, the filtering chamber including a lower portion containing granular media and configured to permit the granular media to interact with the liquid containing impurities, thereby removing impurities from the liquid to produce filtrate;
   a filtrate section in fluid communication with the filtering chamber for receiving the filtrate, the filtrate section being in fluid communication with a first outlet for outflow of the filtrate;
   a gas supplying system for delivering gas to the granular media in the filtering chamber for transport of a portion of the granular media from the lower portion of the filtering chamber to a granular media washer;
   a reject section in fluid communication with the granular media washer for receiving a reject mixture comprising liquid and impurities from the granular media washer, the reject section being in fluid communication with a second outlet for outflow of a portion of the reject mixture;
   a valve disposed at the second outlet; and
   a control unit that is configured to:
      (i) determine whether the portion of the granular media is being transported properly from the lower portion of the filtering chamber to the granular media washer;
      (ii) control the gas supplying system to operate a gas burst sequence if the portion of the granular media is not being transported properly from the lower portion of the filtering chamber to the granular media washer; and
      (iii) control the valve.

2. The apparatus of claim 1 in which the control unit is configured to open the valve to allow outflow of a portion of the reject mixture or to close the valve to preclude outflow of a portion of the reject mixture.

3. The apparatus of claim 1 in which a determination of whether the portion of the granular media is being transported properly is based on an amount of reject mixture in the reject section.

4. The apparatus of claim 3 in which the amount of reject mixture in the reject section is determined with the valve open.

5. The apparatus of claim 4 in which the amount of the reject mixture in the reject section is based on a level of reject mixture flowing over a reject weir.

6. The apparatus of claim 1 in which a gas flow during the gas burst sequence comprises a burst of gas having a duration ranging from three to sixty seconds.

7. The apparatus of claim 1 in which the gas supplying system comprises at least two separate paths for supplying gas.

8. The apparatus of claim 7 in which the at least two separate paths terminate at the lower portion of the filtering chamber.

9. The apparatus of claim 8 in which one of the at least two separate paths terminates at an upper position in the lower portion of the filtering chamber and the other of the at least two separate paths terminates at a lower position in the lower portion of the filtering chamber, the upper position being above the lower position.

10. The apparatus of claim 9 in which the control unit is configured to independently initiate, maintain, or terminate gas flowing through each of the at least two separate paths of the gas supplying system.

11. An apparatus for treating a liquid containing impurities, comprising:
   a filtering chamber for receiving liquid containing impurities from a liquid feed line, the filtering chamber including a lower portion containing granular media and configured to permit the granular media to interact with the liquid containing impurities, thereby removing impurities from the liquid to produce filtrate;
   a plurality of feed arms in fluid communication with the liquid feed line, which extend radially in the lower portion of the filtering chamber, for feeding liquid to the granular media through one or more openings along each feed arm;
   a filtrate section in fluid communication with the filtering chamber for receiving the filtrate, the filtrate section being in fluid communication with a first outlet for outflow of the filtrate;

a gas supplying system for delivering gas to the granular media in the filtering chamber for transport of a portion of the granular media to a granular media washer;

a reject section in fluid communication with the granular media washer for receiving a reject mixture comprising liquid and impurities from the granular media washer, the reject section being in fluid communication with a second outlet for outflow of a portion of the reject mixture;

a valve disposed at the second outlet; and a control unit that is configured to:
  (i) receive one or more signals from at least one sensor;
  (ii) control the gas supplying system to deliver gas to the granular media at one or more intervals sufficient to inhibit or prevent bridging of the granular media across adjacent feed arms, the one or more intervals being determined by the one or more signals from the at least one sensor; and
  (iii) control the valve.

12. The apparatus of claim 11 in which the one or more openings are located along a bottom of each feed arm.

13. The apparatus of claim 11 in which a top of each feed arm presents one or more cutting edges, and each edge is formed by two planar surfaces meeting at an angle ranging from 10 to 90 degrees.

14. The apparatus of claim 11 in which a top of each feed arm presents one or more cutting edges, and the one or more edges are provided by one or more gussets.

15. The apparatus of claim 11 in which a top of each feed arm presents one or more cutting edges, and each edge comprises an edge of an angular prism.

16. The apparatus of claim 15 in which the angular prism comprises a triangular prism.

17. The apparatus of claim 11 in which the one or more signals from the at least one sensor represents head loss between the feed line and the first outlet.

18. The apparatus of claim 11 in which the one or more signals from the at least one sensor represents an amount of reject mixture in the reject section.

19. The apparatus of claim 18 in which the amount of reject mixture in the rejection section is determined by a level of water flowing over a reject weir.

20. An apparatus for treating a liquid containing impurities, comprising:

a filtering chamber for receiving liquid containing impurities from a liquid feed line, the filtering chamber including a lower portion containing granular media and configured to permit the granular media to interact with the liquid containing impurities, thereby removing impurities from the liquid to produce filtrate;

a plurality of feed arms in fluid communication with the liquid feed line, which extend radially in the lower portion of the filtering chamber, for feeding liquid to the granular media through one or more openings along each feed arm;

an annular space in fluid communication with the liquid feed line and the plurality of feed arms, the annular space equipped with a bottom plate having a plurality of openings and a circumferential plate, wherein the plurality of feed arms extend from the circumferential plate;

a filtrate section in fluid communication with the filtering chamber for receiving the filtrate, the filtrate section being in fluid communication with a first outlet for outflow of the filtrate;

a gas supplying system for delivering gas to the granular media in the filtering chamber for transport of a portion of the granular media to a granular media washer; and a reject section in fluid communication with the granular media washer for receiving a reject mixture comprising liquid and impurities from the granular media washer, the reject section being in fluid communication with a second outlet for outflow of a portion of the reject mixture.

21. The apparatus of claim 20 further comprising an airlift pump through which the portion of the granular media is transported.

22. The apparatus of claim 20 further comprising a valve disposed at the second outlet.

23. The apparatus of claim 22 further comprising a control unit that is configured to:
  (i) receive one or more signals from at least one sensor;
  (ii) control the gas supplying system; and
  (iii) control the valve.

24. The apparatus of claim 20 in which each of the plurality of openings is positioned between adjacent feed arms.

25. The apparatus of claim 24 in which each of the plurality of openings is semicircularly shaped.

26. The apparatus of claim 24 in which each of the plurality of openings comprises eye-shaped cutouts.

27. The apparatus of claim 24 in which the gas supplying system is operated intermittently.

28. The apparatus of claim 27 in which the intermittent operation of the gas supplying system is sufficient to inhibit or prevent bridging of the granular media across adjacent feed arms.

29. The apparatus of claim 27 further comprising a control unit including a timer that tracks one or more time intervals between the intermittent operations of the gas supplying system.

30. The apparatus of claim 29 in which the one or more time intervals is sufficiently short to inhibit or prevent bridging of the granular media across adjacent feed arms.

31. The apparatus of claim 20 in which the circumferential plate is a portion of a conical plate which extends past the bottom plate, wherein each of the plurality of openings empties into a conical space formed by the conical plate at a lower portion of the filtering chamber.

32. The apparatus of claim 31 in which the airlift pump passes through a central portion of the conical space.

33. The apparatus of claim 20 in which a top of each feed arm presenting one or more cutting edges.

34. The apparatus of claim 20 in which the circumferential plate is a portion of a conical plate.

* * * * *